United States Patent
Sarashiya

(10) Patent No.: US 12,490,097 B2
(45) Date of Patent: Dec. 2, 2025

(54) CORE NETWORK NODE, MEC SERVER, EXTERNAL SERVER, COMMUNICATION SYSTEM, CONTROL METHOD, PROGRAM, AND NON-TRANSITORY RECORDING MEDIUM HAVING RECORDED THEREON PROGRAM

(71) Applicant: NEC Corporation, Tokyo (JP)

(72) Inventor: Koichi Sarashiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 394 days.

(21) Appl. No.: 18/011,309

(22) PCT Filed: Jun. 21, 2021

(86) PCT No.: PCT/JP2021/023324
§ 371 (c)(1),
(2) Date: Dec. 19, 2022

(87) PCT Pub. No.: WO2021/261422
PCT Pub. Date: Dec. 30, 2021

(65) Prior Publication Data
US 2023/0199499 A1    Jun. 22, 2023

(30) Foreign Application Priority Data
Jun. 26, 2020    (JP) .................. 2020-110059

(51) Int. Cl.
*H04W 8/08*    (2009.01)
*H04W 12/122*    (2021.01)
*H04W 48/08*    (2009.01)

(52) U.S. Cl.
CPC ......... *H04W 12/122* (2021.01); *H04W 8/082* (2013.01); *H04W 48/08* (2013.01)

(58) Field of Classification Search
CPC .... H04W 12/122; H04W 8/082; H04W 48/08
See application file for complete search history.

(56) References Cited

U.S. PATENT DOCUMENTS

| 2018/0192390 A1 | 7/2018 | Li et al. | |
| 2019/0007500 A1* | 1/2019 | Kim | ...................... H04L 67/141 |
| 2019/0116486 A1* | 4/2019 | Kim | ........................ H04W 8/10 |

(Continued)

FOREIGN PATENT DOCUMENTS

| JP | 2019-536305 A | 12/2019 |
| WO | 2018/235836 A1 | 12/2018 |
| WO | 2020/068521 A1 | 4/2020 |

OTHER PUBLICATIONS

JP Office Action for JP Application No. 2022-531960, mailed on Aug. 6, 2024 with English Translation.

(Continued)

*Primary Examiner* — Kent Krueger
(74) *Attorney, Agent, or Firm* — Sughrue Mion, PLLC

(57) ABSTRACT

In order to appropriately accommodate a terminal apparatus, based on security information, a core network node 350 configured to belong to a core network forming a plurality of network slices includes a communication processing unit configured to send, to a terminal apparatus 100, a command indicating a parameter related to a network slice for accommodating the terminal apparatus 100, based on security information related to security of the terminal apparatus 100.

3 Claims, 20 Drawing Sheets

(56) References Cited

U.S. PATENT DOCUMENTS

2020/0128503 A1\* 4/2020 Li .......................... H04W 4/60
2020/0314731 A1\* 10/2020 Ryu ................... H04W 64/003
2021/0337380 A1   10/2021 Ianev et al.

OTHER PUBLICATIONS

Qualcomm Incorporated, "Discussion on Slice-Specific Secondary Authentication and Authorization", 3GPP TSG CT WG1 Meeting #114 C1-190236, Jan. 14, 2019, p. 1-p. 4.
International Search Report for PCT Application No. PCT/JP2021/023324, mailed on Sep. 21, 2021.
Written opinion for PCT Application No. PCT/JP2021/023324, mailed on Sep. 21, 2021.
3GPP TR 38.913 V15.0.0—Technical Specification Group Radio Access Network; Study on Scenarios and Requirements for Next Generation Access Technologies;(Release 15), Jun. 2018.
3GPP TS 23.501 V16.4.0—Technical Specification Group Services and System Aspects; System architecture for the 5G System (5GS): Stage 2 (Release 16), Mar. 2020.
3GPP TS 23.502 V16.4.0—Technical Specification Group Services and System Aspects; Procedures for the 5G System (5GS); Stage 2 (Release 16). Mar. 2020.
3GPP TS 23.003 V16.2.0—Technical Specification Group Core Network and Terminals; Numbering, addressing and identification: (Release 16), Mar. 2020.
English translation of Written opinion for PCT Application No. PCT/JP2021/023324, mailed on Sep. 21, 2021.

\* cited by examiner

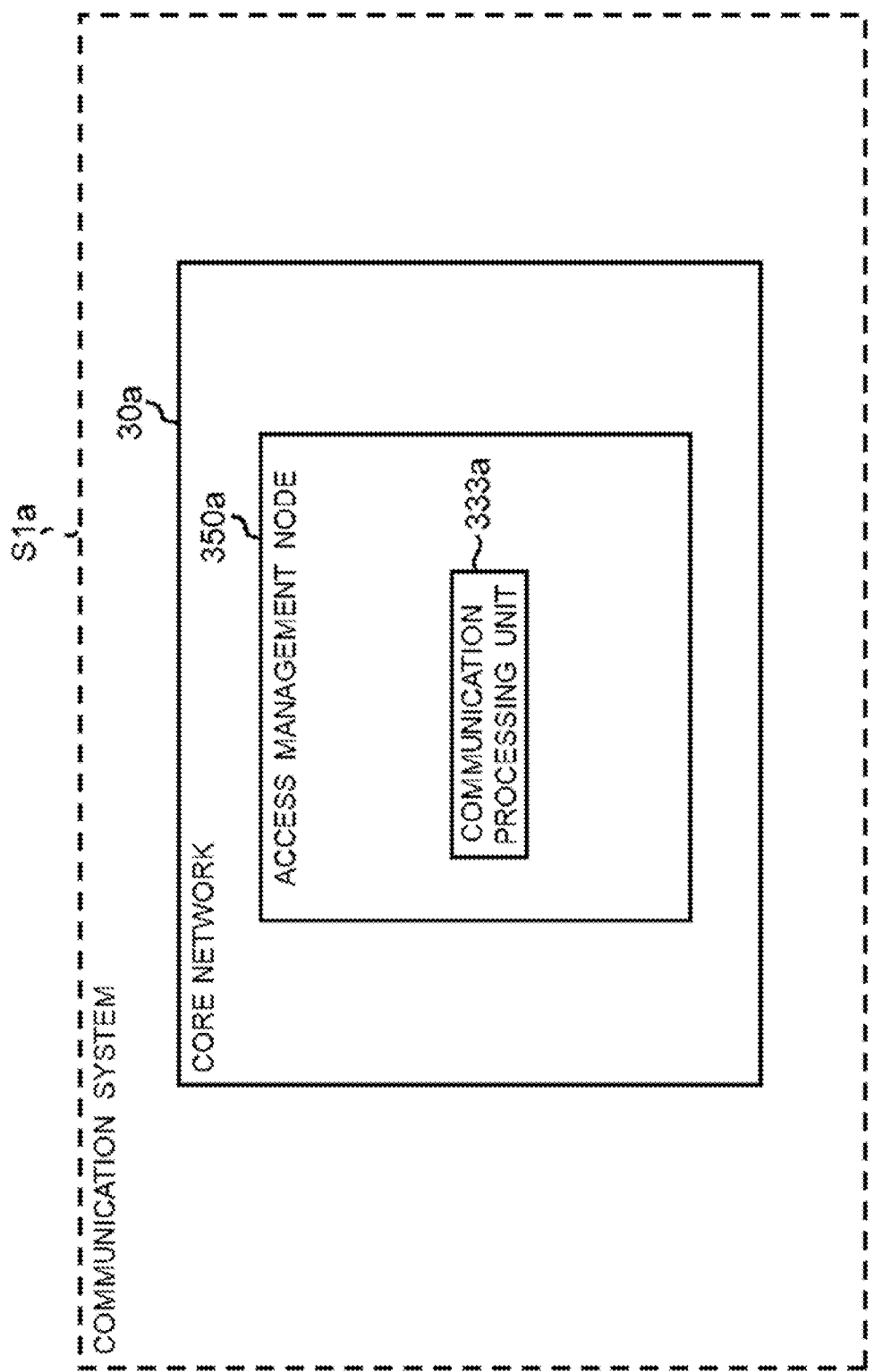

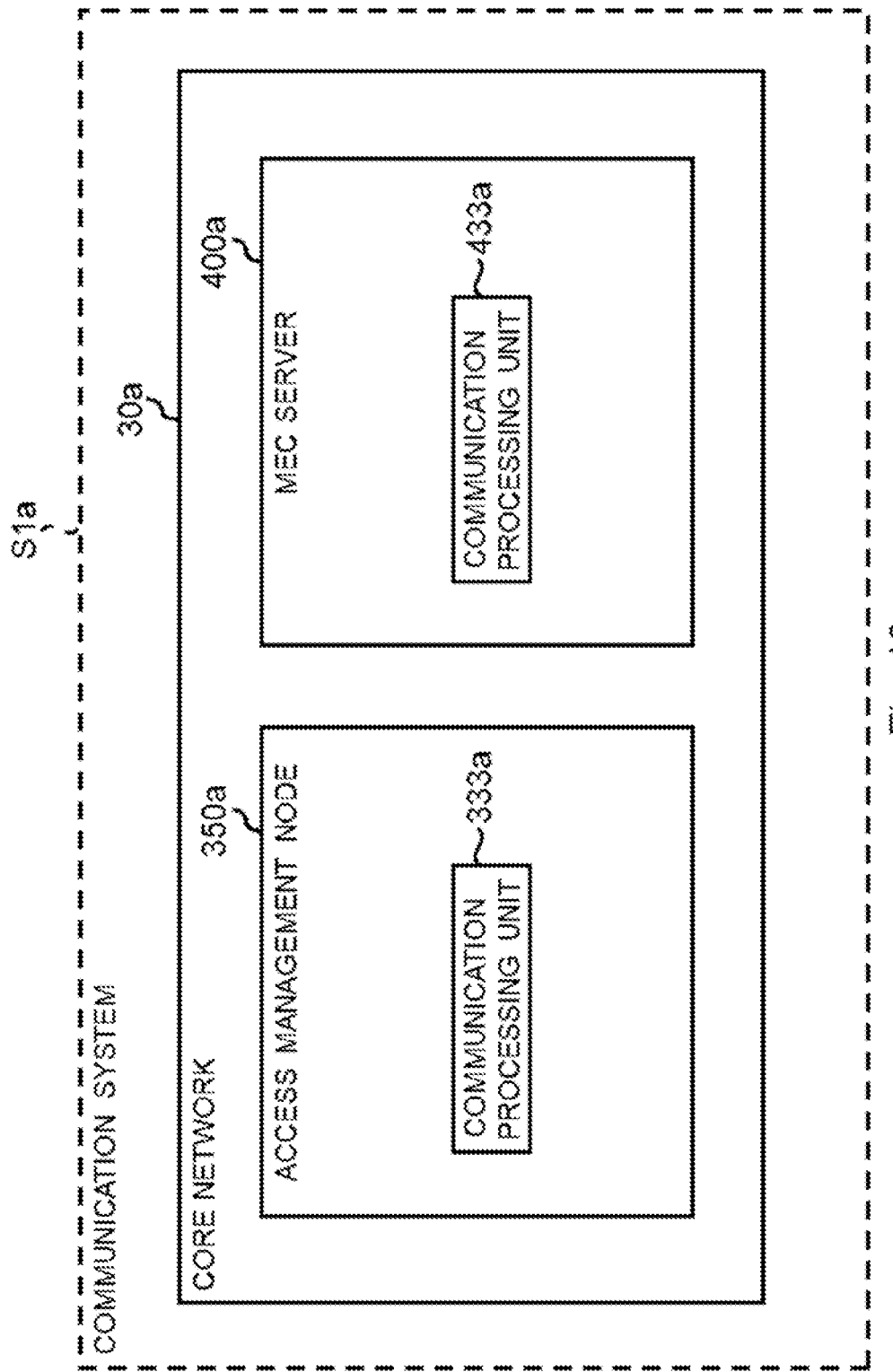

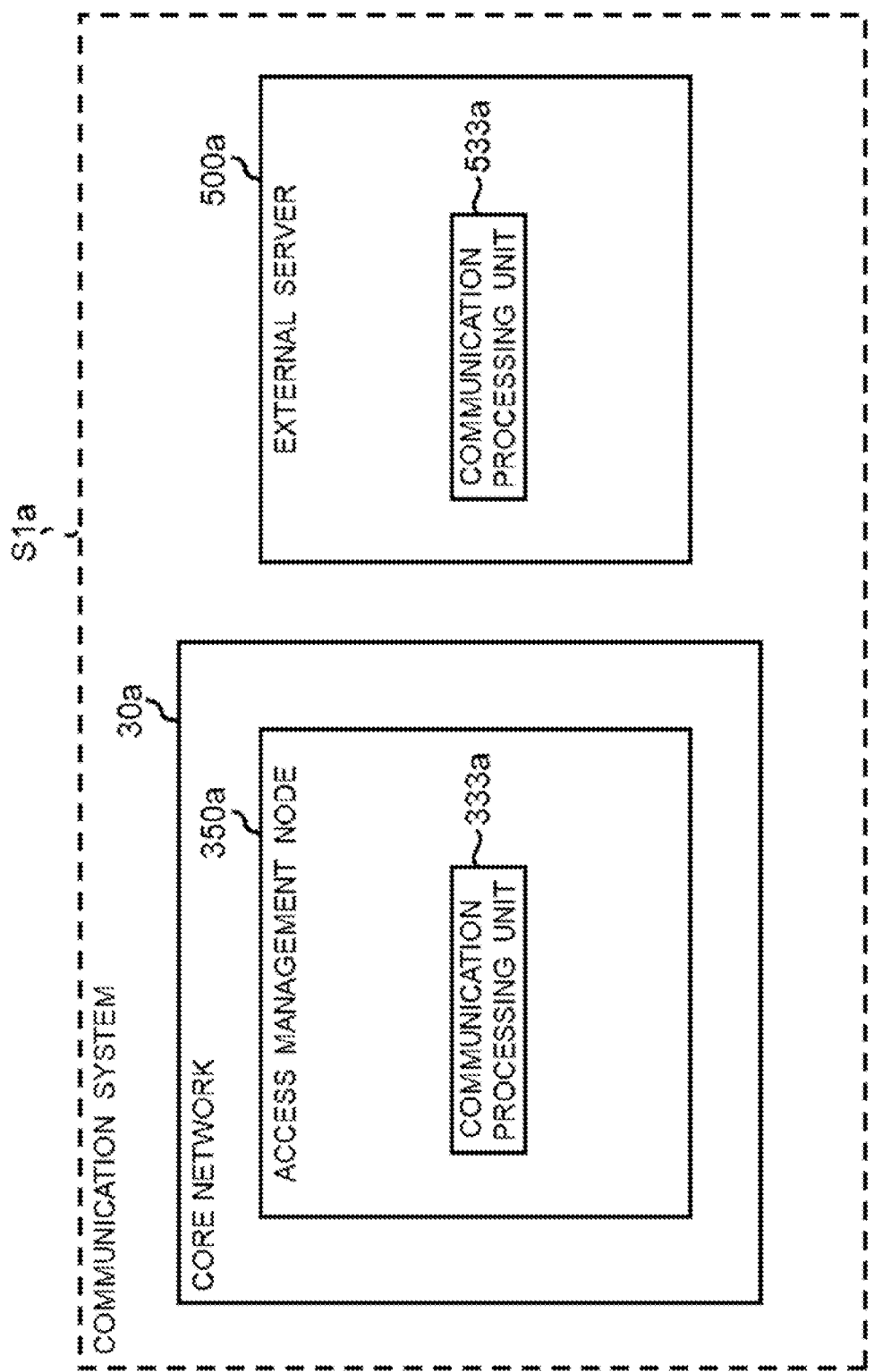

CORE NETWORK NODE, MEC SERVER, EXTERNAL SERVER, COMMUNICATION SYSTEM, CONTROL METHOD, PROGRAM, AND NON-TRANSITORY RECORDING MEDIUM HAVING RECORDED THEREON PROGRAM

This application is a National Stage Entry of PCT/JP2021/023324 filed on Jun. 21, 2021, which claims priority from Japanese Patent Application 2020-110059 filed on Jun. 26, 2020, the contents of all of which are incorporated herein by reference, in their entirety.

TECHNICAL FIELD

The present invention relates to a core network node, a MEC server, an external server, a communication system, a control method, a program, and a non-transitory recording medium having recorded thereon a program.

BACKGROUND ART

Recent years have seen the spread of Internet of Things (IoT), where various "things" are connected to the Internet, which has led to an increase in communication traffic with an increase in the variety of services provided via networks. To deal with such a situation above, introduction of the fifth-generation mobile communication system (5G, below) is in progress in various countries.

3G/4G which have been used is operated by specific mobile network providers to provide communication services to mobile terminals such as mobile phones and smartphones. However, for 5G, compared with 3G/4G, participation of various providers and simultaneous connections of various devices are assumed (e.g., NPL 1).

CITATION LIST

Non Patent Literature

[NPL 1] 3GPP TR 38.913—Technical Specification Group Radio Access Network; Study on Scenarios and Requirements for Next Generation Access Technologies

SUMMARY

Technical Problem

To address cyber-attack, network security techniques, such as an intrusion detection system and a firewall/intrusion prevention system, have been used heretofore. However, for security in 5G, it is required to deal with new situations as those described above including an increase in communication traffic and simultaneous connections of a number of devices.

Hence, in 5G, it is necessary to hold more network facilities within a system than before and appropriately manage various devices connected to the system and providers. Currently, development of a security technique suitable for a radio communication system, such as a system of 5G, having characteristics as those described above is desired.

In view of the above circumstances, an example object of the present invention is to provide a core network node, a MEC server, an external server, a communication system, a control method, a program, and a non-transitory recording medium having recorded thereon a program, that enable appropriate accommodation based on security information.

Solution to Problem

According to one example aspect of the present invention, a core network node configured to belong to a core network forming a plurality of network slices, the core network node including: a communication processing unit configured to send, to a terminal apparatus, a command indicating a parameter related to a network slice for accommodating the terminal apparatus, based on security information related to security of the terminal apparatus.

According to one example aspect of the present invention, a MEC server configured to belong to a core network forming a plurality of network slices or configured to communicate with a core network forming a plurality of network slices, the MEC server including: a communication processing unit configured to send, to a core network node configured to belong to the core network, a message including security information related to security of the terminal apparatus.

According to one example aspect of the present invention, an external server configured to communicate with a core network forming a plurality of network slices, the external server including: a communication processing unit configured to send, to a core network node configured to belong to the core network, a message including security information related to security of the terminal apparatus.

According to one example aspect of the present invention, a communication system including: a core network node configured to belong to a core network forming a plurality of network slices, wherein the core network node includes a communication processing unit configured to send, to a terminal apparatus, a command indicating a parameter related to a network slice for accommodating the terminal apparatus, based on security information related to security of the terminal apparatus.

According to one example aspect of the present invention, a communication system including: a core network node configured to belong to a core network forming a plurality of network slices; and a MEC server configured to belong to the core network or configured to communicate with the core network, wherein the MEC server includes a communication processing unit configured to send, to the core network node, a message including security information related to security of a terminal apparatus, and the core network node includes a communication processing unit configured to send, to the terminal apparatus, a command indicating a parameter related to a network slice for accommodating the terminal apparatus, based on the security information from the MEC server.

According to one example aspect of the present invention, a communication system including: a core network node configured to belong to a core network forming a plurality of network slices; and an external server configured to communicate with the core network, wherein the external server includes a communication processing unit configured to send, to the core network node, a message including security information related to security of a terminal apparatus, and the core network node includes a communication processing unit configured to send, to the terminal apparatus, a command indicating a parameter related to a network slice for accommodating the terminal apparatus, based on the security information from the external server.

According to one example aspect of the present invention, a control method of a core network node configured to belong to a core network forming a plurality of network slices, the control method including: sending, to a terminal apparatus, a command indicating a parameter related to a network slice for accommodating the terminal apparatus, based on security information related to security of the terminal apparatus.

According to one example aspect of the present invention, a program causing a computer to function as a core network node configured to belong to a core network forming a plurality of network slices, and including a communication processing unit configured to send, to a terminal apparatus, a command indicating a parameter related to a network slice for accommodating the terminal apparatus, based on security information related to security of the terminal apparatus.

According to one example aspect of the present invention, a non-transitory recording medium having recorded thereon a program, the program causing a computer to function as a core network node configured to belong to a core network forming a plurality of network slices, including: a communication processing unit configured to send, to a terminal apparatus, a command indicating a parameter related to a network slice for accommodating the terminal apparatus, based on security information related to security of the terminal apparatus.

According to one example aspect of the present invention, a core network node configured to belong to a core network forming a plurality of network slices, the core network node including: a detection unit configured to detect a threat in terms of security, based on a signal sent from and/or received by a node managed by a specific provider; and a communication processing unit configured to perform control to accommodate the specific provider in another network slice, based on the threat thus detected.

According to one example aspect of the present invention, a Mobile Edge Computing (MEC) server configured to belong to a core network forming a plurality of network slices or configured to communicate with the core network forming the plurality of network slices, the MEC server including: a detection unit configured to detect a threat in terms of security, based on a signal sent from and/or received by a node managed by a specific provider; and a communication processing unit configured to send, to a core network node configured to belong to the core network, a message including security information indicating the threat thus detected.

According to one example aspect of the present invention, an external server configured to communicate with a core network forming a plurality of network slices, the external server including: a detection unit configured to detect a threat in terms of security, based on a signal sent from and/or received by a node managed by a specific provider; and a communication processing unit configured to send, to a core network node configured to belong to the core network, a message including security information indicating the threat thus detected.

According to one example aspect of the present invention, a communication system including: a core network node configured to belong to a core network forming a plurality of network slices, wherein the core network node includes a communication processing unit configured to perform control to accommodate a specific provider in another network slice, based on a threat in terms of security detected based on a signal sent from and/or received by a node managed by the specific provider.

According to one example aspect of the present invention, a control method of a core network node configured to belong to a core network forming a plurality of network slices, the control method including: performing control to accommodate a specific provider in another network slice, based on a threat in terms of security detected based on a signal sent from and/or received by a node managed by the specific provider.

According to one example aspect of the present invention, a program causing a computer to function as a core network node configured to belong to a core network forming a plurality of network slices, and including a communication processing unit configured to perform control to accommodate a specific provider in another network slice, based on a threat in terms of security detected based on a signal sent from and/or received by a node managed by the specific provider.

According to one example aspect of the present invention, a non-transitory recording medium having recorded thereon a program, the program causing a computer to function as a core network node configured to belong to a core network forming a plurality of network slices, and including a communication processing unit configured to perform control to accommodate a specific provider in another network slice, based on a threat in terms of security detected based on a signal sent from and/or received by a node managed by the specific provider.

Advantageous Effects of Invention

According to each of the perspectives of the present invention, the core network node, the MEC server, the external server, the communication system, the control method, the program, and the non-transitory recording medium having recorded thereon a program, that enable appropriate accommodation based on security information are provided. Note that, according to the present invention, instead of or together with the above effects, other effects may be exerted.

BRIEF DESCRIPTION OF THE DRAWINGS

FIG. 18 is a block diagram schematically illustrating an example of a first configuration of a communication system S1a according to the second example embodiment of the present invention;

FIG. 19 is a block diagram schematically illustrating an example of a second configuration of the communication system S1a according to the second example embodiment of the present invention; and FIG. 20 is a block diagram schematically illustrating an example of a third configuration of the communication system S1a according to the second example embodiment of the present invention.

DESCRIPTION OF THE EXAMPLE EMBODIMENTS

Figure 1:
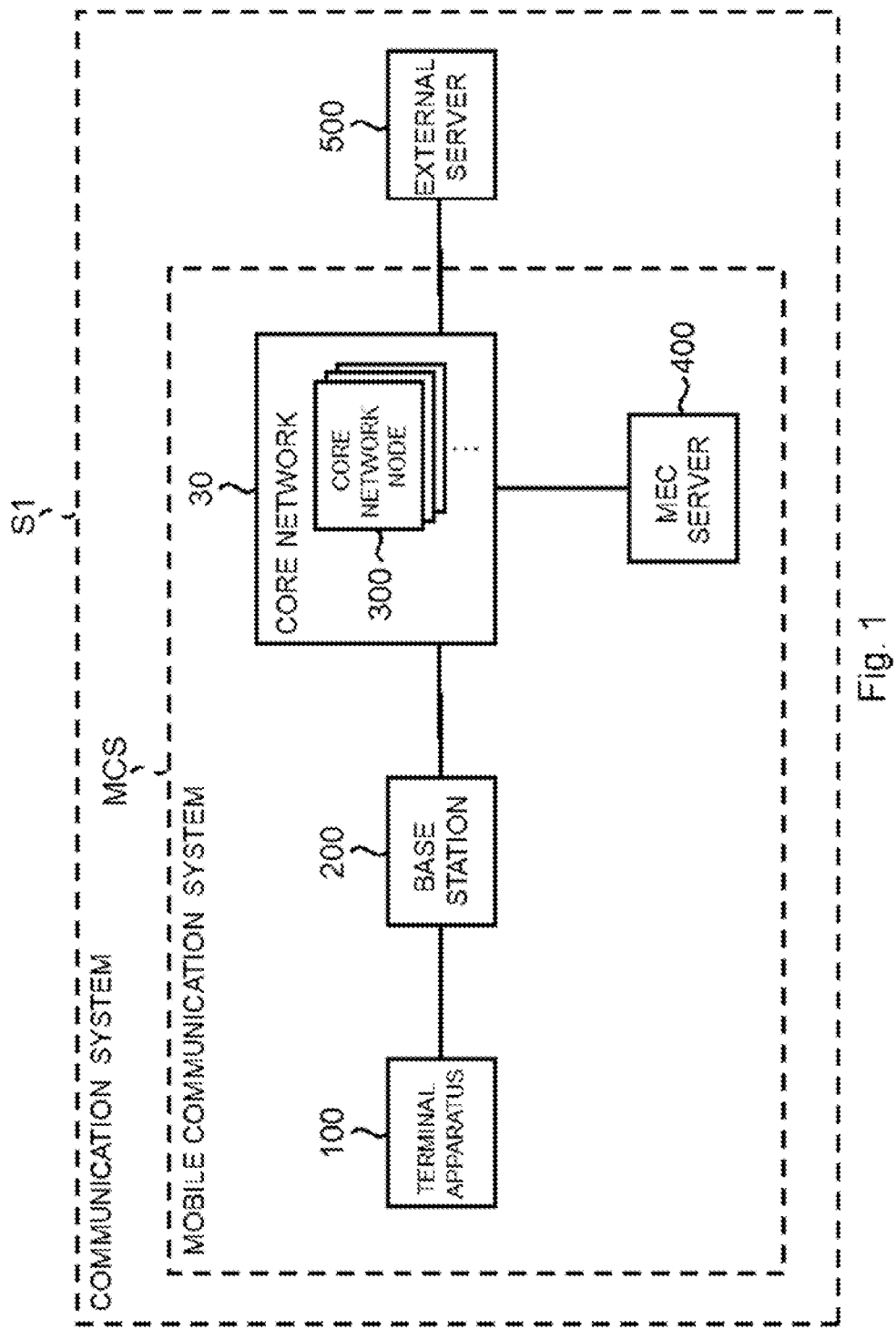
FIG. 1 is an explanatory diagram illustrating an example of a schematic configuration of a communication system S1 according to a first example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Each of the example embodiments to be described below is merely an example of a configuration possible to implement the present invention. Each of the example embodiments below can be appropriately modified or changed according to a configuration of an apparatus to which the present invention is applied and various conditions. Not all the combinations of elements included in each of the example embodiments below are necessarily essential to implement the present invention, and part of the elements can be appropriately omitted. Hence, the scope of the present invention is not to be limited by the configuration described in each of the example embodiments below. As long as there is no mutual inconsistency, a configuration obtained by combining a plurality of configurations described in the example embodiments can also be employed.

Descriptions of the present invention will be given in the following order.

1. Overview of Example Embodiments of the Present Invention
2. First Example Embodiment
   2.1. Configuration of Communication System S1
   2.2. Configuration of Terminal Apparatus 100
   2.3. Configuration of Base Station 200
   2.4. Configuration of Core Network 30
      2.4.1. Configuration of General Core Network Node 300
      2.4.2. Configuration of Access Management Node 350
   2.5. Configuration of MEC Server 400
   2.6. Configuration of External Server 500
   2.7. Operation Examples
      2.7.1. First Operation Example
      2.7.2. Second Operation Example
      2.7.3. Third Operation Example
   2.8. Example Alterations
3. Second Example Embodiment
   3.1. Configuration and Operation Example of Access Management Node 350a
   3.2. Configuration and Operation Example of MEC Server 400a
   3.3. Configuration and Operation Example of External Server 500a
      3.4.1. First Configuration and Operation Example of Communication System S1a
      3.4.2. Second Configuration and Operation Example of Communication System S1a
      3.4.3. Third Configuration and Operation Example of Communication System S1a
4. Other Example Embodiments

1. Overview of Example Embodiments of the Present Invention

First, an overview of example embodiments of the present invention will be described.

(1) Technical Issues

Recent years have seen the spread of Internet of Things (IoT), where various "things" are connected to the Internet, which has led to an increase in communication traffic with an increase in the variety of services provided via networks. To deal with such a situation above, introduction of the fifth-generation mobile communication system (5G, below) is in progress in various countries.

3G/4G which have been used is operated by specific mobile network providers to provide communication services to mobile terminals such as mobile phones and smartphones. However, for 5G, compared with 3G/4G, participation of various providers and simultaneous connections of various devices are assumed.

Heretofore, network security techniques, such as an intrusion detection system and a firewall/intrusion prevention system, have been used. However, for security in 5G, it is required to deal with new situations as those described above including an increase in communication traffic and simultaneous connections of a number of devices.

Hence, in 5G, it is necessary to hold more network facilities within a system than before and appropriately manage various devices connected to the system. Currently, a security technique suitable for a radio communication system, such as a 5G system, having characteristics as those described above is desired.

In view of the above circumstances, an example object of the present example embodiments is to appropriately accommodate a terminal apparatus, based on security information. In particular, in the present example embodiments, focused is messaging suitable for network slicing defined in network architecture specifications (<references> 3GPP TS 23.501, 3GPP TS 23.502, and the like) of 5G. Network slicing is a technique for logically (virtually) dividing the same physical network facilities and combining the logical facilities (virtual resources) obtained through the division, to configure logical communication networks called network slices (or slices).

(2) Technical Features

In the example embodiments of the present invention, a core network node configured to belong to a core network forming a plurality of network slices is configured to send, to a terminal apparatus, a command indicating a parameter related to a network slice for accommodating the terminal apparatus, based on security information related to security of the terminal apparatus. The core network node may acquire the security information by itself.

In one example aspect of the example embodiments of the present invention, a MEC server configured to belong to a core network forming a plurality of network slices or configured to communicate with a core network forming a plurality of network slices is configured to send, to a core network node configured to belong to the core network, a message including security information related to security of the terminal apparatus.

In one example aspect of the example embodiments of the present invention, an external server configured to communicate with a core network forming a plurality of network slices is configured to send, to a core network node configured to belong to the core network, a message including security information related to security of the terminal apparatus.

According to the above-described configurations, it is possible to implement processing of accommodation in an appropriate network slice, based on security information.

Note that, according to the present example embodiments, instead of or together with the above effects, other effects may be exerted. Note that the above-described technical features are concrete examples of the example embodiments of the present invention, and it is apparent that example embodiments of the present invention are not limited to the above-described technical features.

2. First Example Embodiment

Next, a description will be given of a first example embodiment of the present invention with reference to FIGS. 1 to 14.

2.1. Configuration of Communication System S1

FIG. 1 is an explanatory diagram illustrating an example of a schematic configuration of a communication system S1 according to the present example embodiment. As illustrated in FIG. 1, the communication system S1 of the present example embodiment includes a terminal apparatus 100, a base station 200, a core network 30, a Mobile Edge Computing (MEC) server 400, and an external server 500. The core network 30 includes a plurality of core network nodes 300. The external server 500 is a server apparatus located outside a mobile communication system MCS (core network 30) and is connected to the core network 30 to be capable of communicating with the core network 30.

The mobile communication system MCS is, for example, a system conforming to 3rd Generation Partnership Project (3GPP) technical specifications (TSs). More specifically, the mobile communication system MCS may be a fifth-generation mobile communication system conforming to fifth-generation (5G) technical specifications. The mobile communication system MCS may be local 5G privately established by an individual provider that is not a communication provider. The mobile communication system MCS is included in the communication system S1. The configuration of the communication system S1 is, of course, not limited to this example.

2.2. Configuration of Terminal Apparatus 100

The terminal apparatus 100 is a node configured to perform radio communication with the base station 200. The terminal apparatus 100 may be, for example, a mobile phone terminal, such as a smartphone, a communication module mounted on an autonomous vehicle, or a communication module mounted on an IoT device, such as a security camera or a robot. In other words, the terminal apparatus 100 may be a node for enhanced mobile broadband (eMBB), a node for ultra-reliable and low latency communications (URLLC), a node for massive machine type communications (mMTC), or a node for vehicle to X (V2X).

Figure 2:
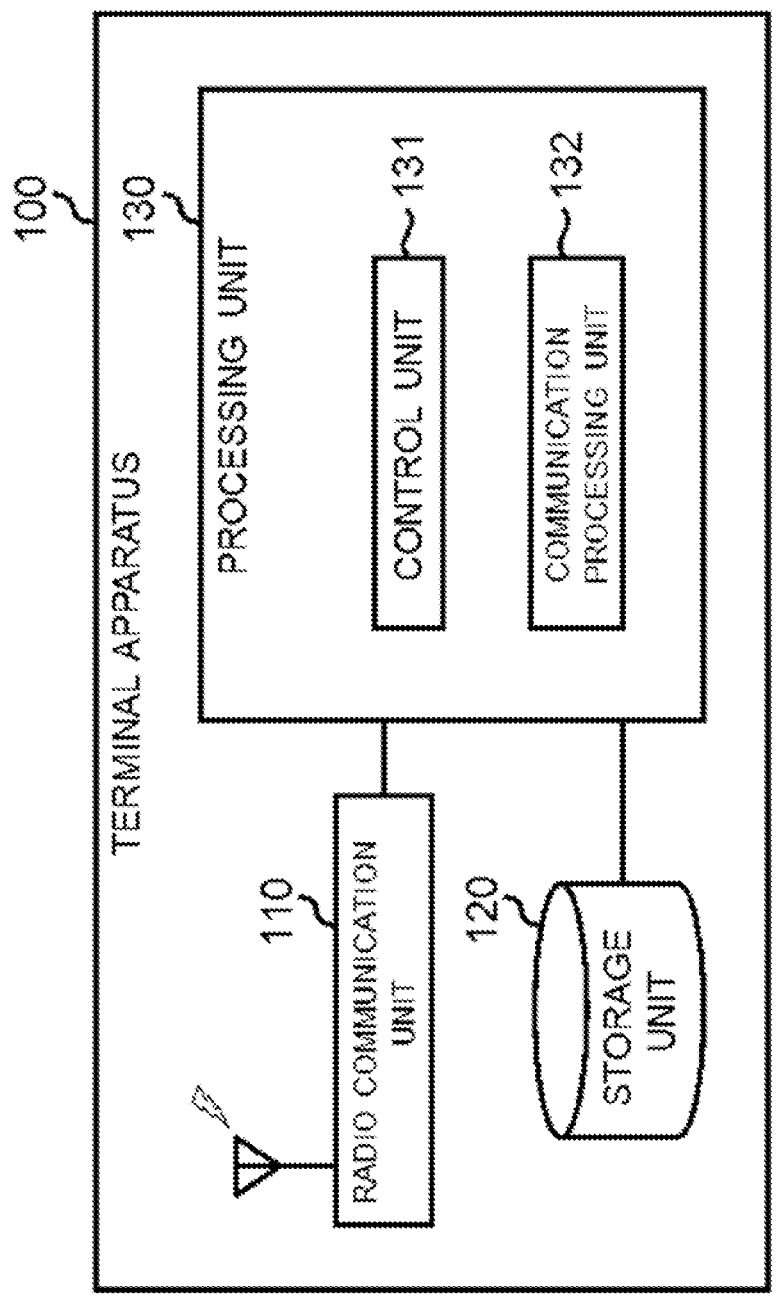
FIG. 2 is a block diagram illustrating an example of a schematic configuration of a terminal apparatus 100 according to the first example embodiment of the present invention.

FIG. 2 is a block diagram illustrating an example of a schematic configuration of the terminal apparatus 100 according to the present example embodiment. As illustrated in FIG. 2, the terminal apparatus 100 includes a radio communication unit 110, a storage unit 120, and a processing unit 130.

The radio communication unit 110 is an element configured to perform radio communication with the base station 200. For example, the radio communication unit 110 sends a radio signal to the base station 200 and receives a radio signal from the base station 200. The radio communication unit 110 may be implemented with an antenna and a radio frequency (RF) circuit, for example.

The storage unit 120 is an element configured to temporarily or permanently store programs (instructions) and data to be used for performing various processes in the terminal apparatus 100. The programs each includes one or more instructions for operations of the terminal apparatus 100. The storage unit 120 may be implemented, for example, with a volatile memory, a non-volatile memory, or a storage medium such as a magnetic disk, or a combination of two or more of these. The storage unit 120 may be integrally configured with one or more processors constituting the processing unit 130.

The processing unit 130 is an element configured to provide various functions of the terminal apparatus 100 and includes a control unit 131 and a communication processing unit 132 as functional blocks. Schematically, the control unit 131 controls the processing of the terminal apparatus 100, and the communication processing unit 132 performs communication processing with other nodes, such as the base station 200. Note that the processing unit 130 may further include a constituent element(s) other than the above functional blocks. In other words, the processing unit 130 can perform operations other than the operations of the above functional blocks.

The processing unit 130 may be implemented with one or more processors, such as a baseband processor, for example. The processing unit 130 may develop any of the programs stored in the storage unit 120, to the storage unit 120 and/or an unillustrated system memory and execute the program, to thereby perform processing of the present example embodiment to be described later. Note that each of the functional blocks (control unit 131 and communication processing unit 132) may be implemented with one or more processors different from the processing unit 130. The processing unit 130 may be implemented in a system on chip (SoC).

2.3. Configuration of Base Station 200

The base station 200 is a node configured to perform radio communication with the terminal apparatus 100, i.e., a radio access network (RAN) node. The base station 200 may be, for example, an evolved Node B (eNB) or a generation Node B (gNB) in 5G.

Figure 3:
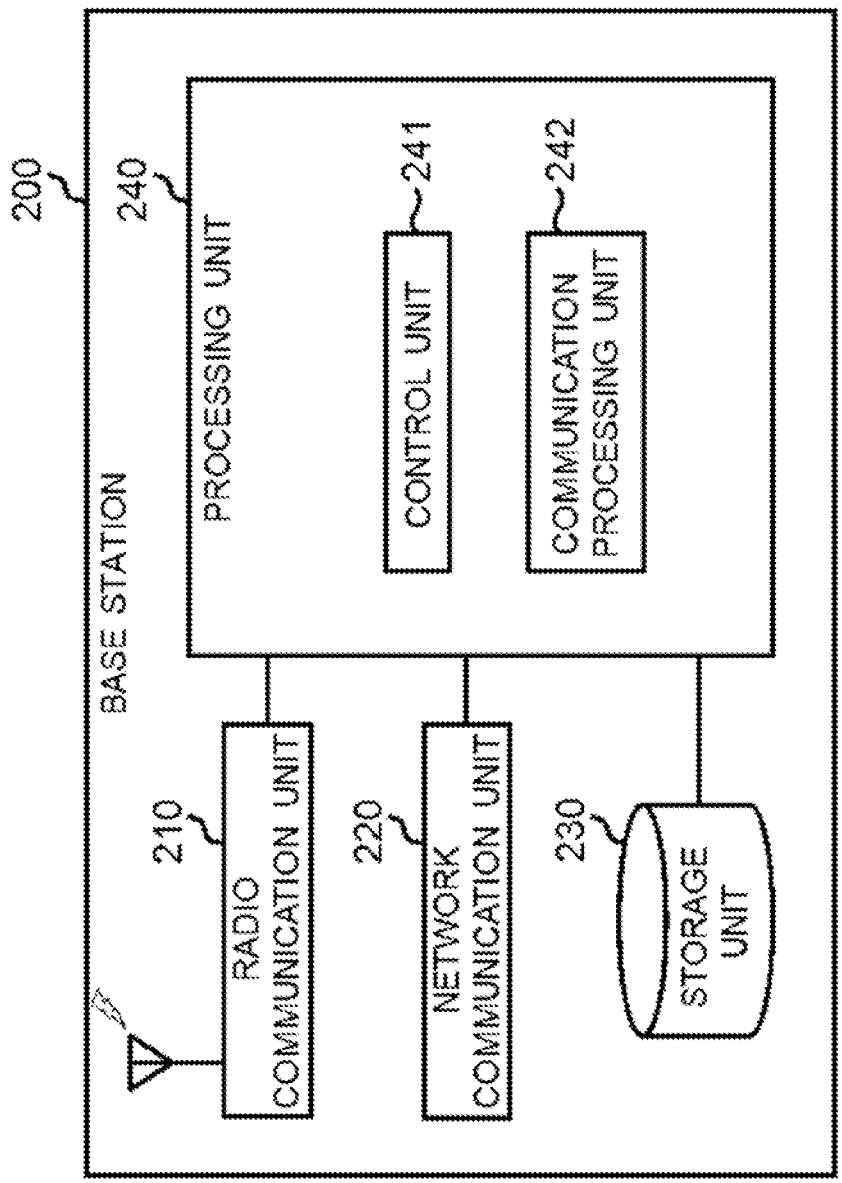
FIG. 3 is a block diagram illustrating an example of a schematic configuration of a base station 200 according to the first example embodiment of the present invention.

FIG. 3 is a block diagram illustrating an example of a schematic configuration of the base station 200 according to the present example embodiment. As illustrated in FIG. 3, the base station 200 includes a radio communication unit 210, a network communication unit 220, a storage unit 230, and a processing unit 240.

The radio communication unit 210 is an element configured to perform radio communication with the terminal apparatus 100. The radio communication unit 210 sends a radio signal to the terminal apparatus 100 and receives a radio signal from the terminal apparatus 100. The radio communication unit 210 may be implemented with an antenna and a radio frequency (RF) circuit, for example.

The network communication unit 220 is an element configured to communicate with the core network 30. The network communication unit 220 sends a signal to the core network 30 and receives a signal from the core network 30. The network communication unit 220 may be implemented with a network adapter and/or a network interface card, for example.

The storage unit 230 is an element configured to temporarily or permanently store programs (instructions) and data to be used for performing various processes in the base station 200. Each of the programs includes one or more instructions for operations of the base station 200. The storage unit 230 may be implemented, for example, with a volatile memory, a non-volatile memory, or a storage medium such as a magnetic disk, or a combination of two or more of these. The storage unit 230 may be integrally configured with one or more processors constituting the processing unit 240.

The processing unit 240 is an element configured to provide various functions of the base station 200 and includes a control unit 241 and a communication processing unit 242 as functional blocks. Schematically, the control unit 241 controls the processing of the base station 200, and the communication processing unit 242 performs communication processing with other nodes, such as the terminal apparatus 100 and the core network node 300. Note that the processing unit 240 may further include a constituent element(s) other than the above functional blocks. In other words, the processing unit 240 can perform operations other than the operations of the above functional blocks.

The processing unit 240 may be implemented with one or more processors, such as a baseband processor, for example. The processing unit 240 may develop any of the programs stored in the storage unit 230, to the storage unit 230 and/or an unillustrated system memory and execute the program, to thereby perform processing of the present example embodiment to be described later. Note that each of the functional blocks (control unit 241 and communication processing unit 242) may be implemented with one or more processors different from the processing unit 240.

Note that the base station 200 may be virtualized. In other words, the base station 200 may be implemented as a virtual machine. In this case, the base station 200 (virtual machine) may operate as a physical machine (hardware) including a processor, a memory, and the like, and a virtual machine on a hypervisor.

2.4. Configuration of Core Network 30

The core network 30 is, for example, a 5G core network (5GC), and is partially or entirely configured by using a network function virtualization (NFV) technique.

Figure 4:
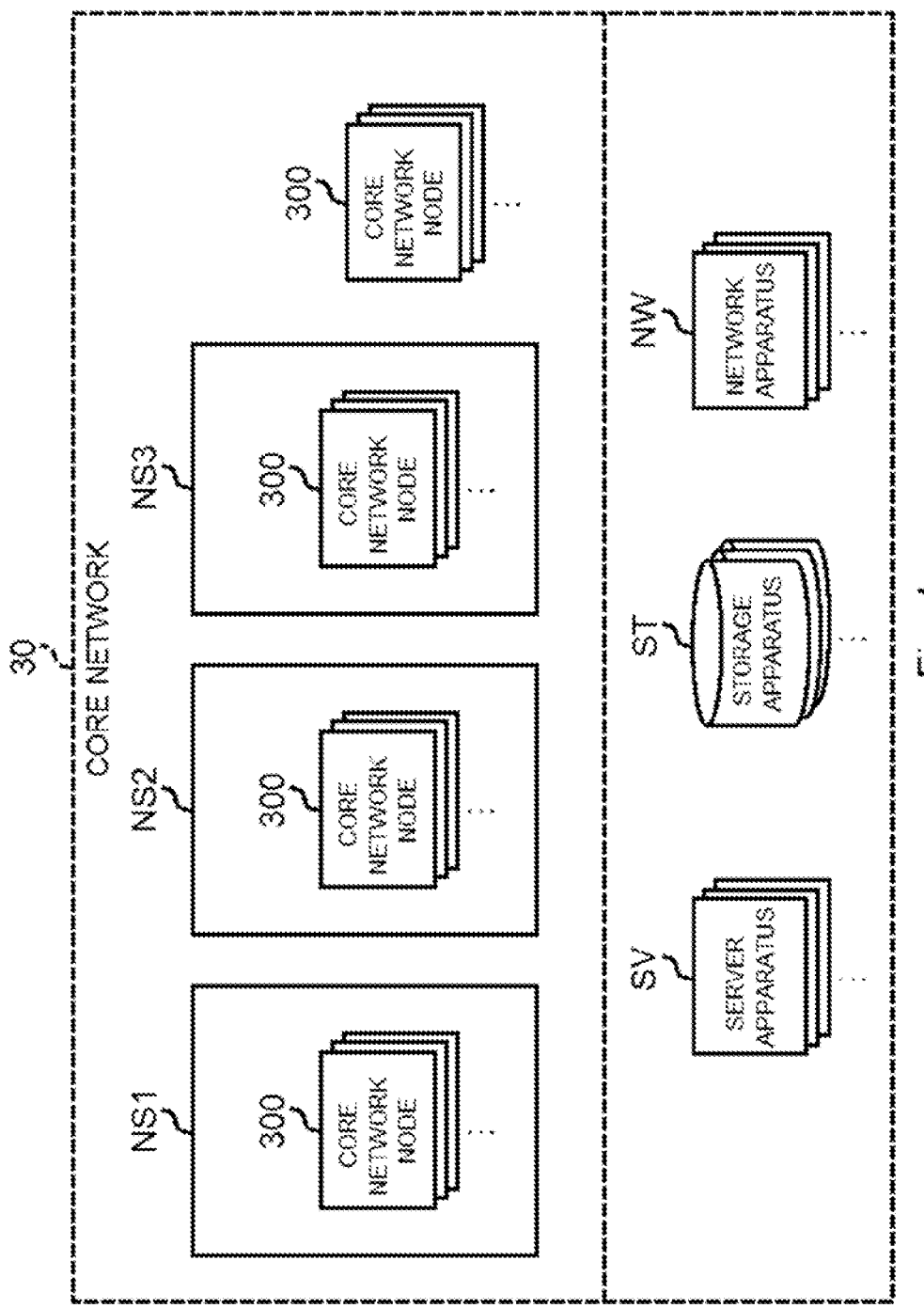
FIG. 4 is a block diagram illustrating an example of a schematic configuration of a core network 30 according to the first example embodiment of the present invention.

FIG. 4 is a block diagram illustrating an example of a schematic configuration of the core network 30 according to the present example embodiment. As illustrated in FIG. 4, the core network 30 includes a server apparatus SV, a storage apparatus ST, and a network apparatus NW as hardware.

The hardware of the core network 30 above is virtualized by using the NFV technique to configure a plurality of core network nodes 300 (instances). Examples of types of the core network node 300 are listed but not limited thereto.

Access and Mobility Management Function (AMF)
Session Management Function (SMF)
Policy Control Function (PCF)
Network Slice Selection Function (NSSF)
Authentication Server Function (AUSF)
Unified Data Management (UDM)
User Plane Function (UPF)

Note that at least part of the plurality of core network nodes 300 may be implemented with a physical apparatus not using the NFV technique.

As illustrated in FIG. 4, resources of the virtualized core network 30 may be divided into a plurality of network slices NS1, NS2, NS3, . . . each configuring a logical (virtual) network. In other words, the core network 30 of the present example embodiment may form a plurality of network slices NS. The plurality of network slices NS have network characteristics different from each other. Each of the network slices NS includes a plurality of core network nodes 300. Note that the core network nodes 300 not configured to belong to any of the network slices NS may be present, and a single core network node 300 may belong to a plurality of network slices NS.

Figure 5:
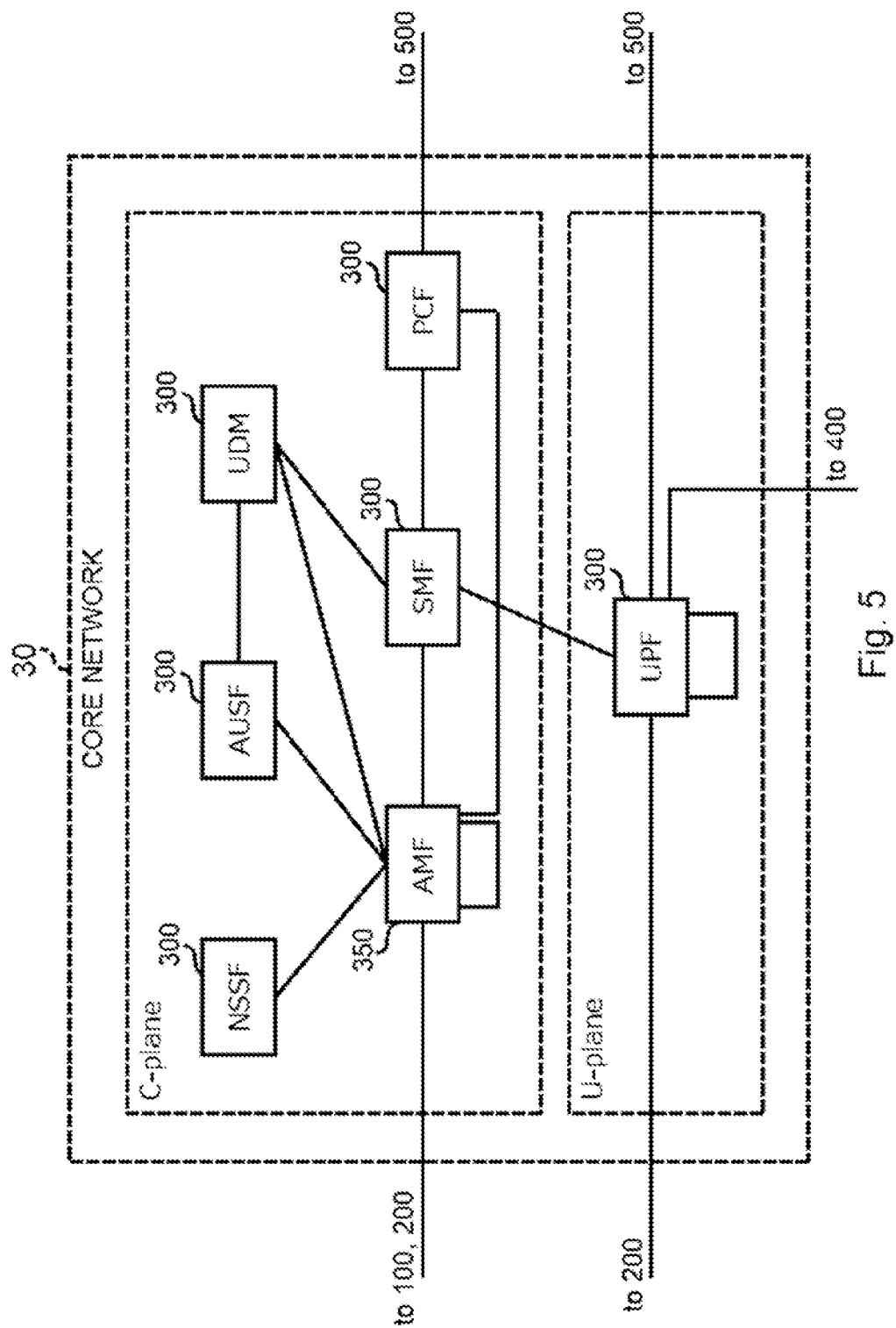
FIG. 5 is an explanatory diagram illustrating an example of an architecture of the core network 30 according to the first example embodiment of the present invention.

FIG. 5 is an explanatory diagram illustrating an example of an architecture of the core network 30. The C-plane of the core network 30 includes the AMF, the SMF, the PCF, the NSSF, the AUSF, and the UDM as network functions (core network nodes 300). The U-plane of the core network 30 includes one or more UPFs as a network function(s) (core network node(s) 300). The UPF may be configured as a connection point for the MEC server 400 and the external server 500 to be described later.

2.4.1. Configuration of General Core Network Node 300

Each of the core network nodes 300 is a functional element configured to provide a specific network function (service) of the core network 30.

Figure 6:
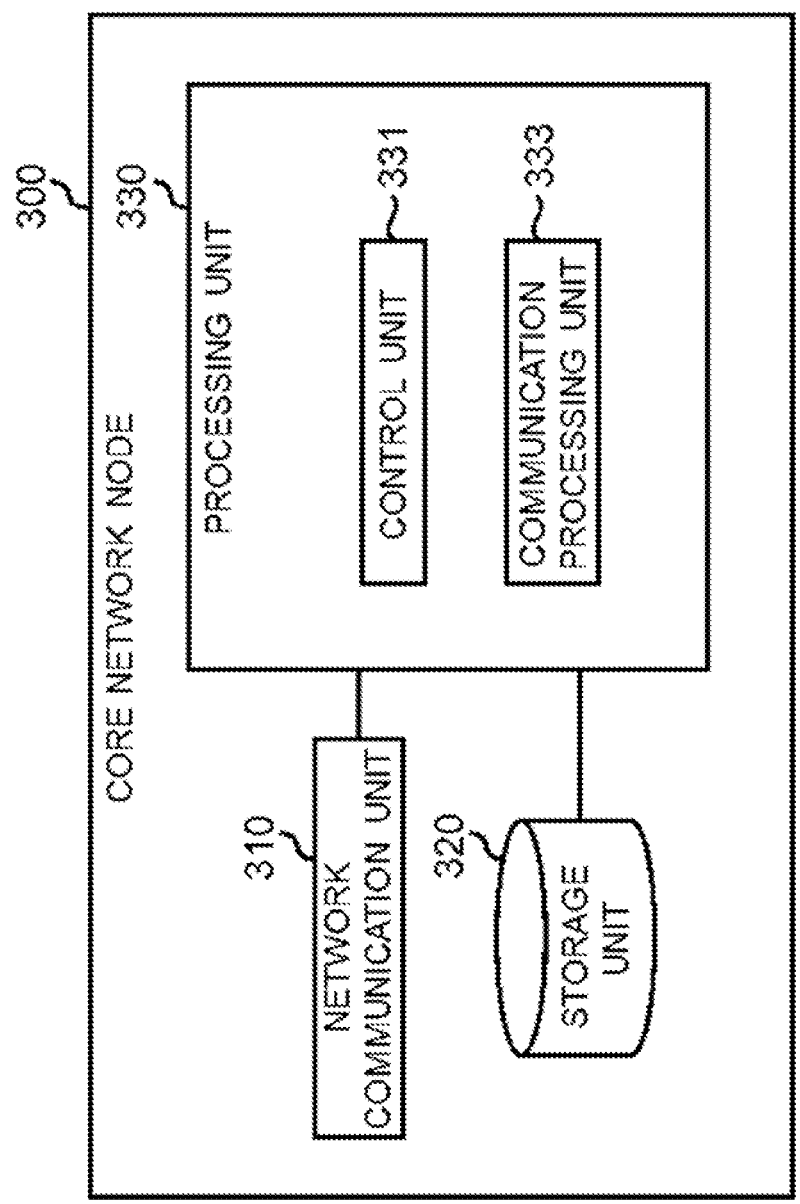
FIG. 6 is a block diagram illustrating an example of a schematic configuration of the core network node 300 according to the first example embodiment of the present invention.

FIG. 6 is a block diagram illustrating an example of a schematic configuration of the core network node 300 according to the present example embodiment. As illustrated in FIG. 6, the core network node 300 includes a network communication unit 310, a storage unit 320, and a processing unit 330.

The network communication unit 310 is an element configured to communicate with other nodes in and outside the core network 30. The network communication unit 310 sends signals to other nodes and receives signals from such other nodes. The network communication unit 310 may be implemented with resources of the core network 30 virtualized by using the NFV technique described above.

The storage unit 320 is an element configured to temporarily or permanently store programs (instructions) and data to be used for performing various processes in the core network node 300. The programs each includes one or more instructions for operations of the core network node 300. The storage unit 320 may be implemented with resources of the core network 30 virtualized by using the NFV technique as described above.

The processing unit 330 is an element configured to provide various functions of the core network node 300 and includes a control unit 331 and a communication processing unit 333 as functional blocks. Schematically, the control unit 331 controls the processing of the core network node 300, and the communication processing unit 333 performs communication processing with other nodes. Note that the processing unit 330 may further include a constituent element(s) other than the above functional blocks. In other words, the processing unit 330 can perform operations other than the operations of the above functional blocks. The processing unit 330 may be implemented with resources of the core network 30 virtualized by using the NFV technique as described above.

2.4.2. Configuration of Access Management Node 350

The access management node 350 is, for example, Access and Mobility Management Function (AMF) defined in 3GPP technical specifications (e.g., <reference> 3GPP TS 23.501). The access management node 350 is a node configured to terminate an N2 interface of the C-plane and provides a registration management function, a connection management function, and a mobility management function.

Figure 7:
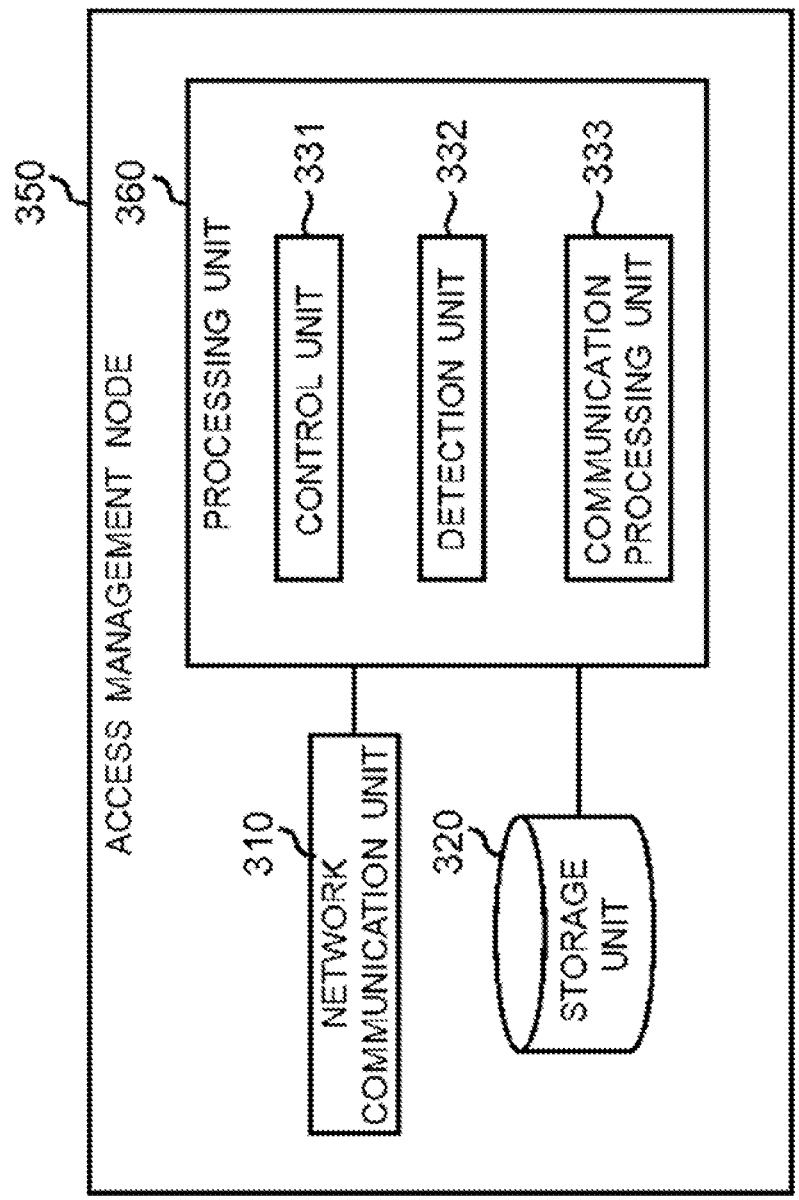
FIG. 7 is a block diagram illustrating an example of a schematic configuration of an access management node 350 according to the first example embodiment of the present invention.

FIG. 7 is a block diagram illustrating an example of a schematic configuration of the access management node 350 according to the present example embodiment. As illustrated in FIG. 7, the access management node 350 includes a network communication unit 310, a storage unit 320, and a processing unit 360. The configurations and functions of the network communication unit 310 and the storage unit 320 are similar to those of a general core network node 300.

The processing unit 360 includes the control unit 331, a detection unit 332, and the communication processing unit 333. The configurations and functions of the control unit 331 and the communication processing unit 333 are similar to those of the general core network node 300. The detection unit 332 is schematically configured to detect a state and information related to security of a node such as the terminal apparatus 100.

Note that the functions of the access management node 350 according to the present example embodiment may be implemented with other network function instances.

2.5. Configuration of MEC Server 400

The MEC server 400 is a server configured to belong to the core network 30 and provides a predetermined service to the terminal apparatus 100. By the MEC server 400 being arranged near the terminal apparatus 100 compared to a general server, the MEC server 400 can provide the service to the terminal apparatus 100 more efficiently.

Figure 8:
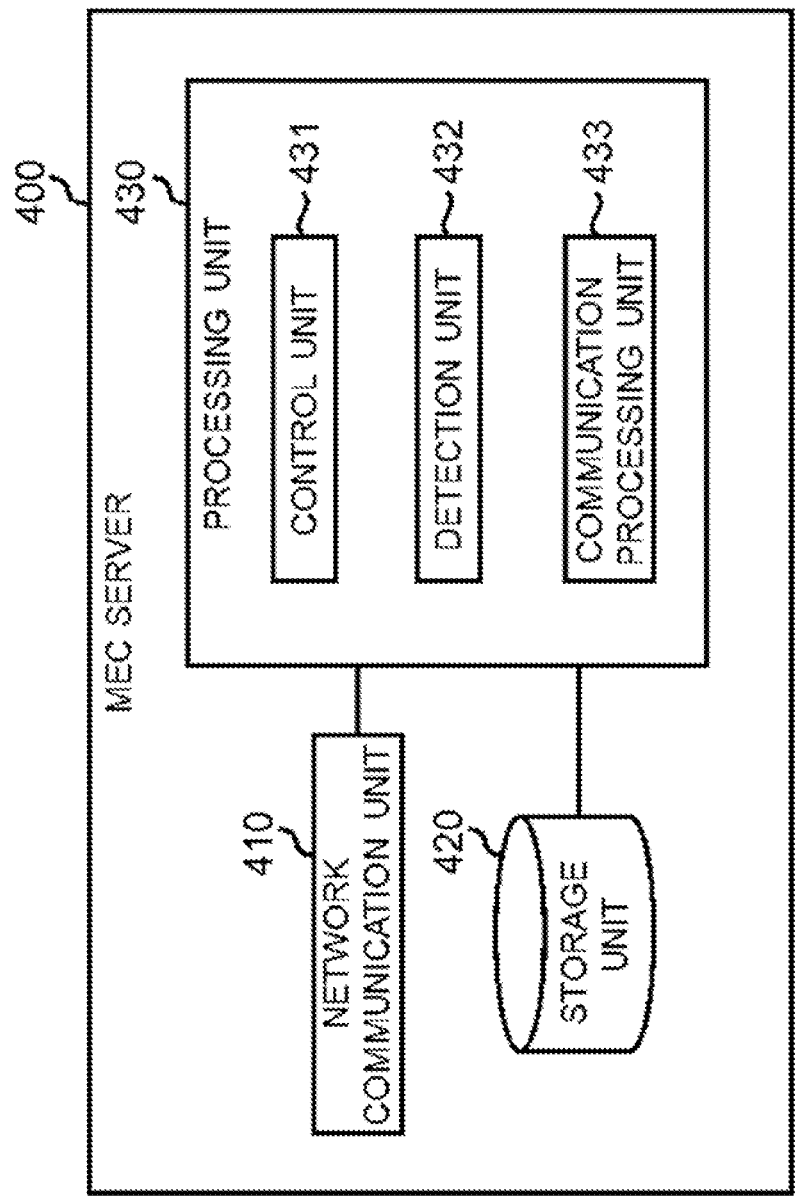
FIG. 8 is a block diagram illustrating an example of a schematic configuration of a MEC server 400 according to the first example embodiment of the present invention.

FIG. 8 is a block diagram illustrating an example of a schematic configuration of the MEC server 400 according to the present example embodiment. As illustrated in FIG. 8, the MEC server 400 includes a network communication unit 410, a storage unit 420, and a processing unit 430.

The network communication unit 410 is an element configured to communicate with the core network 30. The network communication unit 410 sends a signal to the core network 30 and receives a signal from the core network 30. The network communication unit 410 may be implemented with a network adapter and/or a network interface card, for example.

The storage unit 420 is an element configured to temporarily or permanently store programs (instructions) and data to be used for performing various processes in the MEC server 400. The programs each includes one or more instructions for operations of the MEC server 400. The storage unit 420 may be implemented, for example, with a volatile memory, a non-volatile memory, or a storage medium such as a magnetic disk, or a combination of two or more of these. The storage unit 420 may be integrally configured with one or more processors constituting the processing unit 430.

The processing unit 430 is an element configured to provide various functions of the MEC server 400 and includes a control unit 431, a detection unit 432, and a communication processing unit 433 as functional blocks. Schematically, the control unit 431 controls the processing of the MEC server 400, the detection unit 432 detects a state and information related to security of a node such as the terminal apparatus 100, and the communication processing unit 433 performs communication processing with other nodes, such as the core network nodes 300. Note that the processing unit 430 may further include a constituent element(s) other than the above functional blocks. In other words, the processing unit 430 can perform operations other than the operations of the above functional blocks.

The processing unit 430 may be implemented with one or more processors, for example. The processing unit 430 may develop any of the programs stored in the storage unit 420, to the storage unit 420 and/or an unillustrated system memory and execute the program, to thereby perform processing of the present example embodiment to be described later. Note that each of the functional blocks (control unit 431, detection unit 432, and communication processing unit 433) may be implemented with one or more processors different from the processing unit 430.

Note that the MEC server 400 (network communication unit 410, storage unit 420, and processing unit 430) may be implemented with resources virtualized by using the NFV technique. The MEC server 400 may be configured to communicate with the base station 200 instead of the core network 30. In other words, the MEC server 400 may be configured to be capable of communicating with the core network 30 via the base station 200.

2.6. Configuration of External Server 500

The external server 500 is a server located outside the core network 30. The external server 500 is an apparatus configured to provide services to the terminal apparatus 100 via the core network 30 or another network, such as the Internet.

Figure 9:
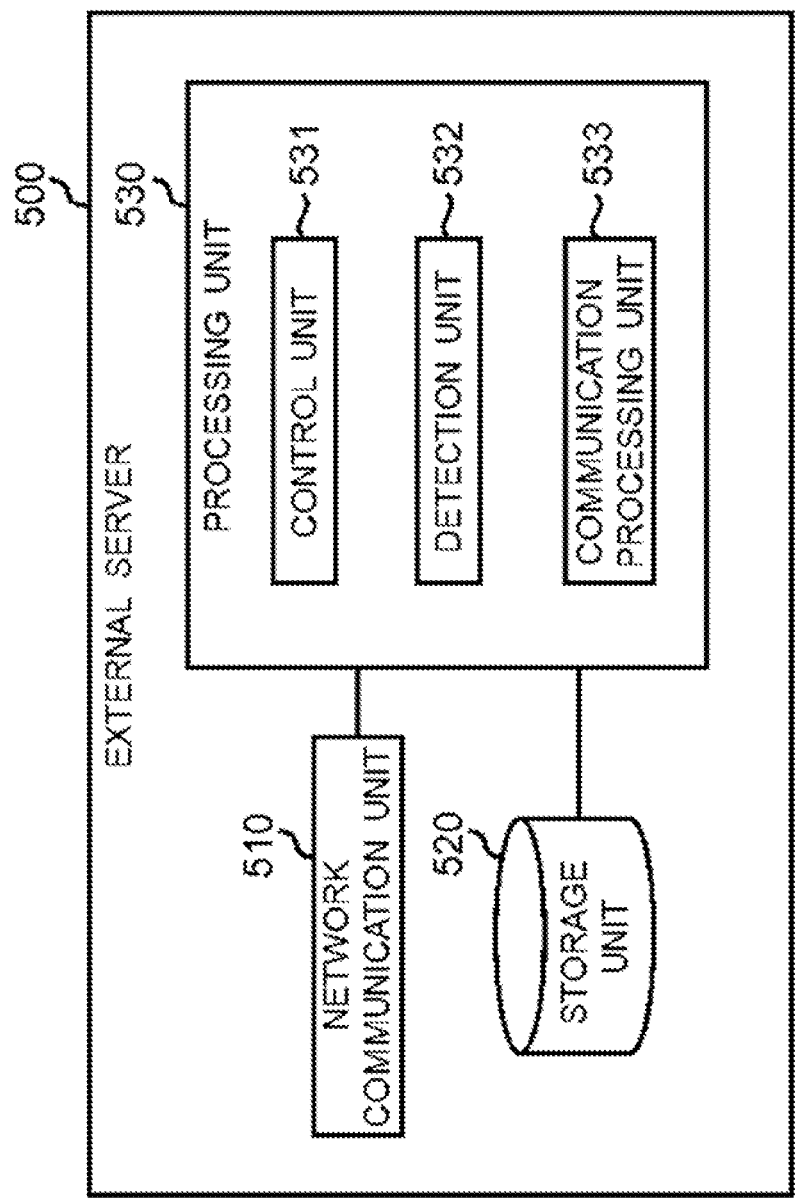
FIG. 9 is a block diagram illustrating an example of a schematic configuration of an external server 500 according to the first example embodiment of the present invention.

FIG. 9 is a block diagram illustrating an example of a schematic configuration of the external server 500 according to the present example embodiment. As illustrated in FIG. 9, the external server 500 includes a network communication unit 510, a storage unit 520, and a processing unit 530.

The network communication unit 510 is an element configured to communicate with the core network 30. The network communication unit 510 sends a signal to the core network 30 and receives a signal from the core network 30.

The network communication unit 510 may be implemented with a network adapter and/or a network interface card, for example.

The storage unit 520 is an element configured to temporarily or permanently store programs (instructions) and data to be used for performing various processes in the external server 500. The programs each includes one or more instructions for operations of the external server 500. The storage unit 520 may be implemented, for example, with a volatile memory, a non-volatile memory, or a storage medium such as a magnetic disk, or a combination of two or more of these. The storage unit 520 may be integrally configured with one or more processors constituting the processing unit 530.

The processing unit 530 is an element configured to provide various functions of the external server 500 and includes a control unit 531, a detection unit 532, and a communication processing unit 533 as functional blocks. Schematically, the control unit 531 controls the processing of the external server 500, the detection unit 532 detects a state and information related to security of a node such as the terminal apparatus 100, and the communication processing unit 533 performs communication processing with other nodes, such as the core network nodes 300. Note that the processing unit 530 may further include a constituent element(s) other than the above functional blocks. In other words, the processing unit 530 can perform operations other than the operations of the above functional blocks.

The processing unit 530 may be implemented with one or more processors, for example. The processing unit 530 may develop any of the programs stored in the storage unit 520, to the storage unit 520 and/or an unillustrated system memory and execute the program, to thereby perform processing of the present example embodiment to be described later. Note that each of the functional blocks (control unit 531, detection unit 532, and communication processing unit 533) may be implemented with one or more processors different from the processing unit 530.

2.7. Operation Examples

A description will be given of a plurality of operation examples of the present example embodiment with reference to FIGS. 10 to 14. The operation examples below are common in that the communication processing unit 333 of the access management node 350 sends, to the terminal apparatus 100, a command indicating a parameter related to the network slice NS for accommodating the terminal apparatus 100, based on the security information SI related to security of the terminal apparatus 100.

The command may include, for example, slice information for specifying the network slice NS for accommodating the terminal apparatus 100. The command may be, for example, a UE Configuration Update Command for updating the configuration of the terminal apparatus 100 (user equipment (UE)). The slice information included in the command may include, for example, a Network Slice Selection Assistance Information (NSSAI) parameter for specifying a slice/service type (SST).

Figure 10:
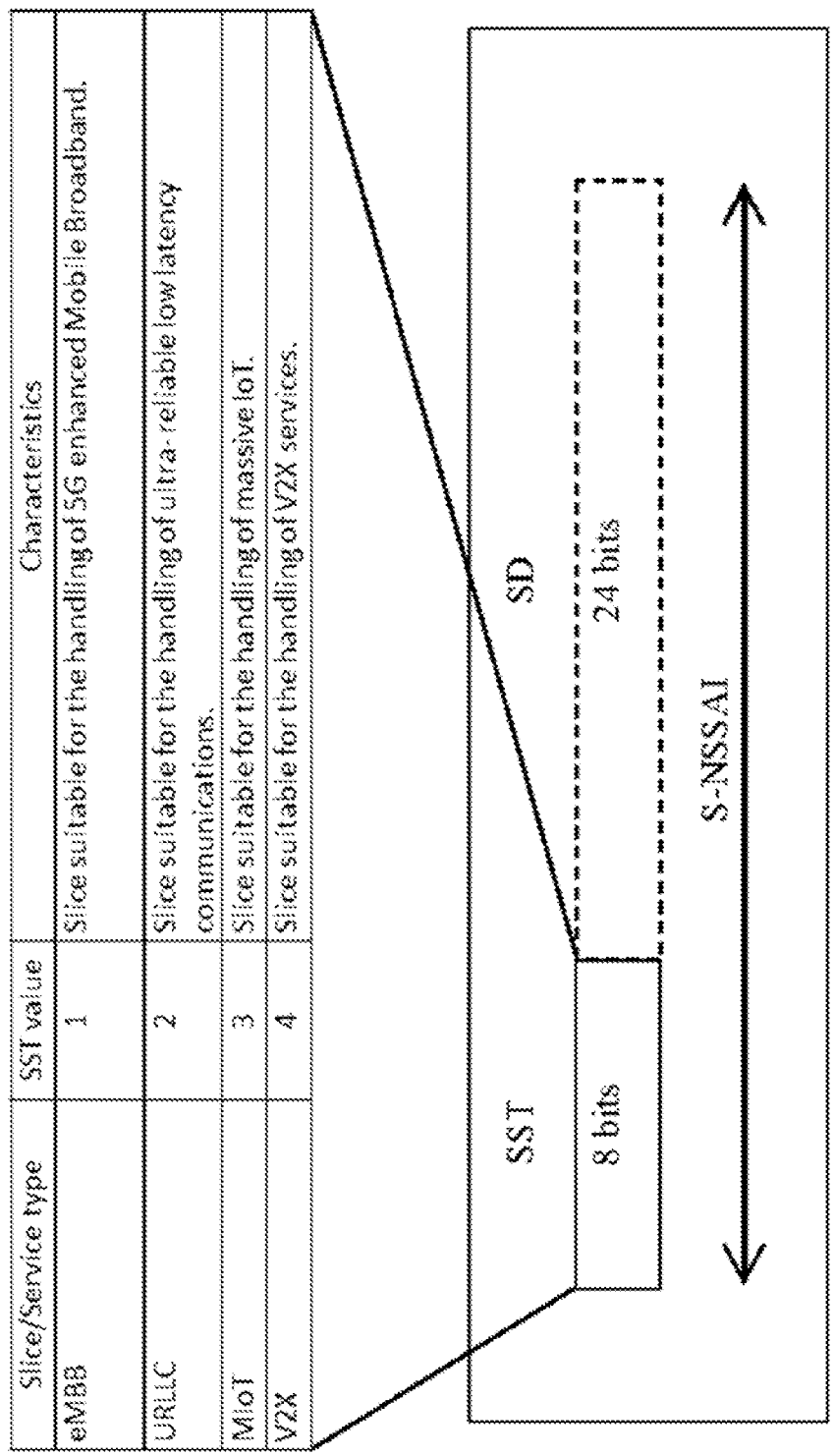
FIG. 10 is an explanatory diagram illustrating an example of existing S-NSSAI and SSTs.

The UE Configuration Update Command may conform, for example, to <reference> 3GPP TS 23.502 (e.g., 4.2.4.2 UE Configuration Update procedure for access and mobility management related parameters). NSSAI (e.g., S-NSSAI) for specifying an SST may conform, for example, to <reference> 3GPP TS 23.003 (e.g., 28.4.2 Format of the S-NSSAI) and <reference> 3GPP TS 3GPP TS 23.501 (e.g., 5.15.2.2 Standardised SST values). The SST may indicate a value (SST Value) for specifying eMBB, URLLC, mMTC (MIoT), V2X, or the like. FIG. 10 is an explanatory diagram illustrating an example of S-NSSAI and SSTs.

Here, as illustrated in FIG. 10, in the existing technical specifications, only SSTs corresponding to static network characteristics are defined, and no SST (also no network slice NS) corresponding to a detected threat or detected vulnerability (security information) is defined. Moreover, selection of a network slice NS corresponding to a detected threat or detected vulnerability (security information) is not defined in the existing technical specifications (e.g., <reference> 4.2.4.2 UE Configuration Update procedure for access and mobility management related parameters in 3GPP TS 23.502).

2.7.1. First Operation Example

Figure 11:
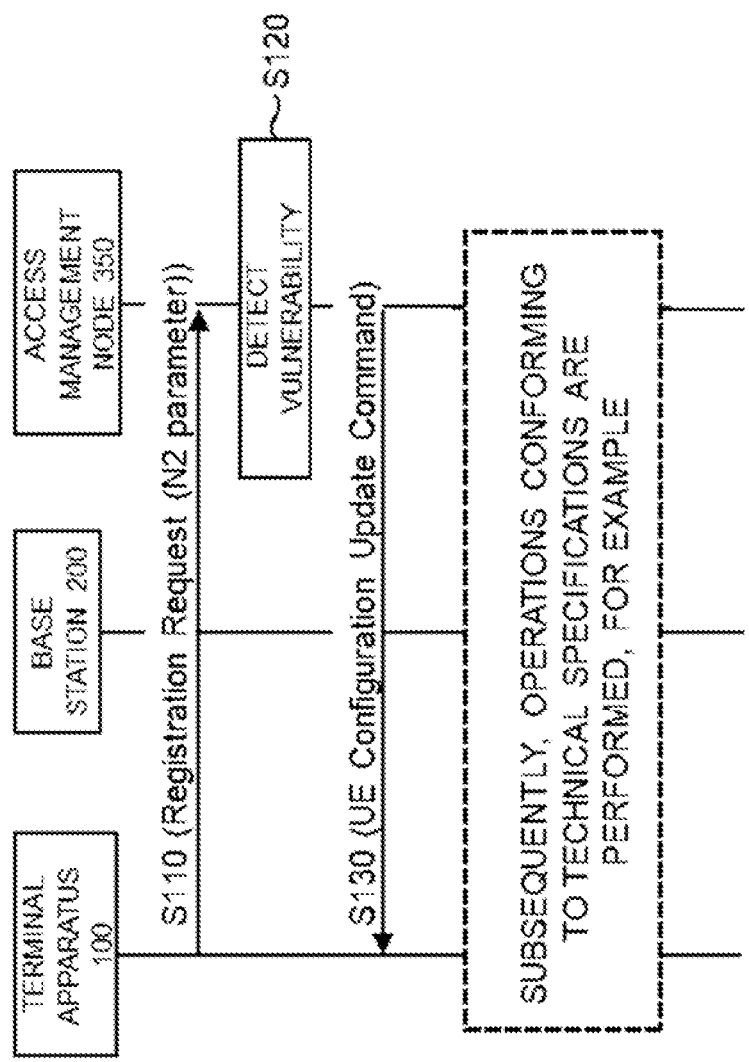
FIG. 11 is a sequence diagram illustrating a first operation example of the first example embodiment of the present invention.
Figure 12:
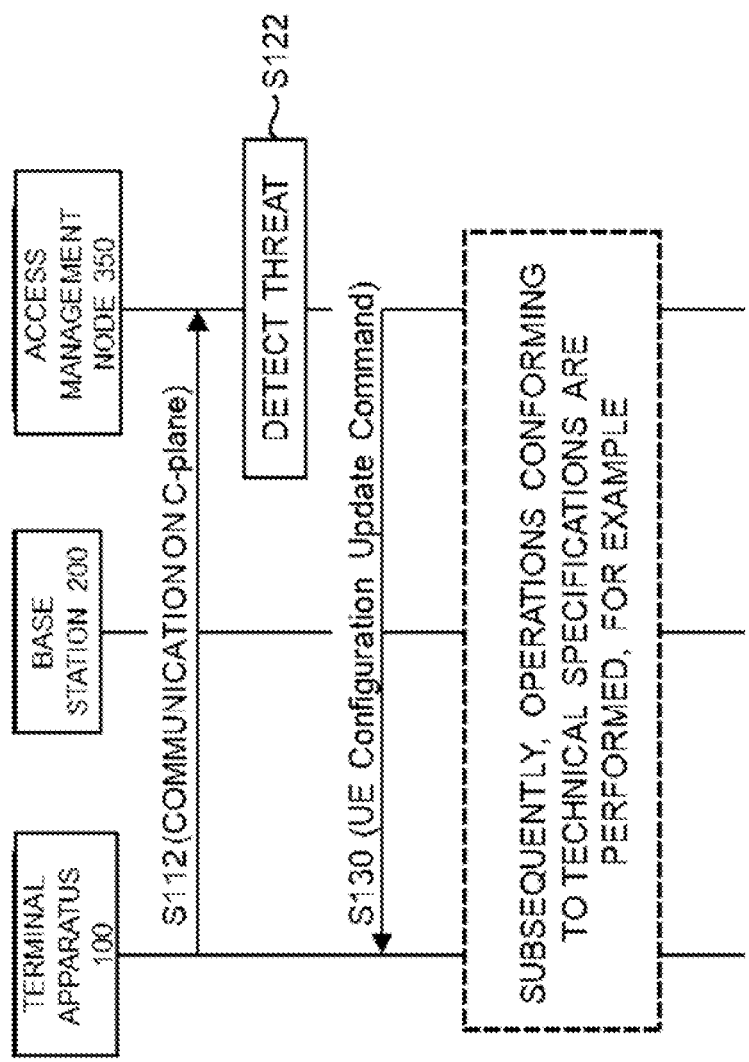
FIG. 12 is a sequence diagram illustrating another first operation example of the first example embodiment of the present invention.

FIGS. 11 and 12 are each a sequence diagram illustrating a first operation example of the present example embodiment. FIG. 11 corresponds to an example in which the access management node 350 detects vulnerability, based on a control message from the terminal apparatus 100, and FIG. 12 corresponds to an example in which the access management node 350 detects a threat, based on a content of communication of the terminal apparatus 100.

As illustrated in FIG. 11, in step S110, the communication processing unit 132 of the terminal apparatus 100 sends a registration request message (Registration Request Message) to the access management node 350 via the base station 200. The terminal apparatus 100 may send the registration request message above to the access management node 350 at the time of location registration, for example. The registration request message above may include an N2 parameter indicating a security capability of the terminal apparatus 100. The registration request message above is a C-plane message.

In step S120, the detection unit 332 of the access management node 350 detects vulnerability present in the terminal apparatus 100, based on the security capability of the terminal apparatus 100 indicated in the registration request message sent from the terminal apparatus 100. The detection unit 332 notifies the communication processing unit 333 of the detected vulnerability as the security information SI.

In step S130, the communication processing unit 333 of the access management node 350 sends, to the terminal apparatus 100, a command indicating a parameter related to the network slice NS for accommodating the terminal apparatus 100, based on the security information SI notified by the detection unit 332.

The command sent in step S130 may specify, for example, a quarantine network slice, which is a network slice NS having a quarantine function. In other words, the communication processing unit 333 may cause the quarantine network slice having the quarantine function to accommodate the terminal apparatus 100, based on the security information SI.

The command sent in step S130 may specify, for example, a network slice NS having a security level corresponding to the security capability of the terminal apparatus 100. In other words, the communication processing unit 333 may cause the network slice NS having the security level corresponding to the security information SI to accommodate the terminal apparatus 100.

In the following, each node including the terminal apparatus 100 performs an operation related to a configuration change of the network slice NS, based on vulnerability detected as described above (i.e., the security information SI), to thereby accommodate the terminal apparatus 100 in the appropriate network slice NS.

Next, an example in FIG. 12 will be described. As illustrated in FIG. 12, in step S112, the communication processing unit 132 of the terminal apparatus 100 sends a signal on the C-plane to the access management node 350 via the base station 200. The signal may be, for example, a control message related to authentication or may be any of other control messages.

In step S122, the detection unit 332 of the access management node 350 detects a threat to the terminal apparatus 100, based on the signal on the C-plane sent from the terminal apparatus 100 (content of communication of the terminal apparatus 100 on the C-plane). The detection unit 332 notifies the communication processing unit 333 of the detected threat as the security information SI. Note that the detection unit 332 may detect vulnerability present in the terminal apparatus 100, based on the content of communication of the terminal apparatus 100 on the C-plane.

In step S130, similarly to the example in FIG. 11, the communication processing unit 333 of the access management node 350 sends, to the terminal apparatus 100, a command indicating a parameter related to the network slice NS for accommodating the terminal apparatus 100, based on the security information SI notified by the detection unit 332.

An operation caused by the command sent in step S130 is similar to that of the example in FIG. 11. Specifically, the terminal apparatus 100 may be accommodated in a quarantine network slice having a quarantine function, based on the security information SI, or the terminal apparatus 100 may be accommodated in the network slice NS having the security level corresponding to the security information SI.

For example, the command sent in step S130 may be a command for enabling such control as to separate, from the core network 30, an attack target indicated by the threat included in the security information SI.

In the following, similarly to the example in FIG. 11, each node including the terminal apparatus 100 performs an operation related to a configuration change of the network slice NS, based on a threat detected as described above (i.e., the security information SI), to thereby accommodate the terminal apparatus 100 in the appropriate network slice NS.

2.7.2. Second Operation Example

Figure 13:
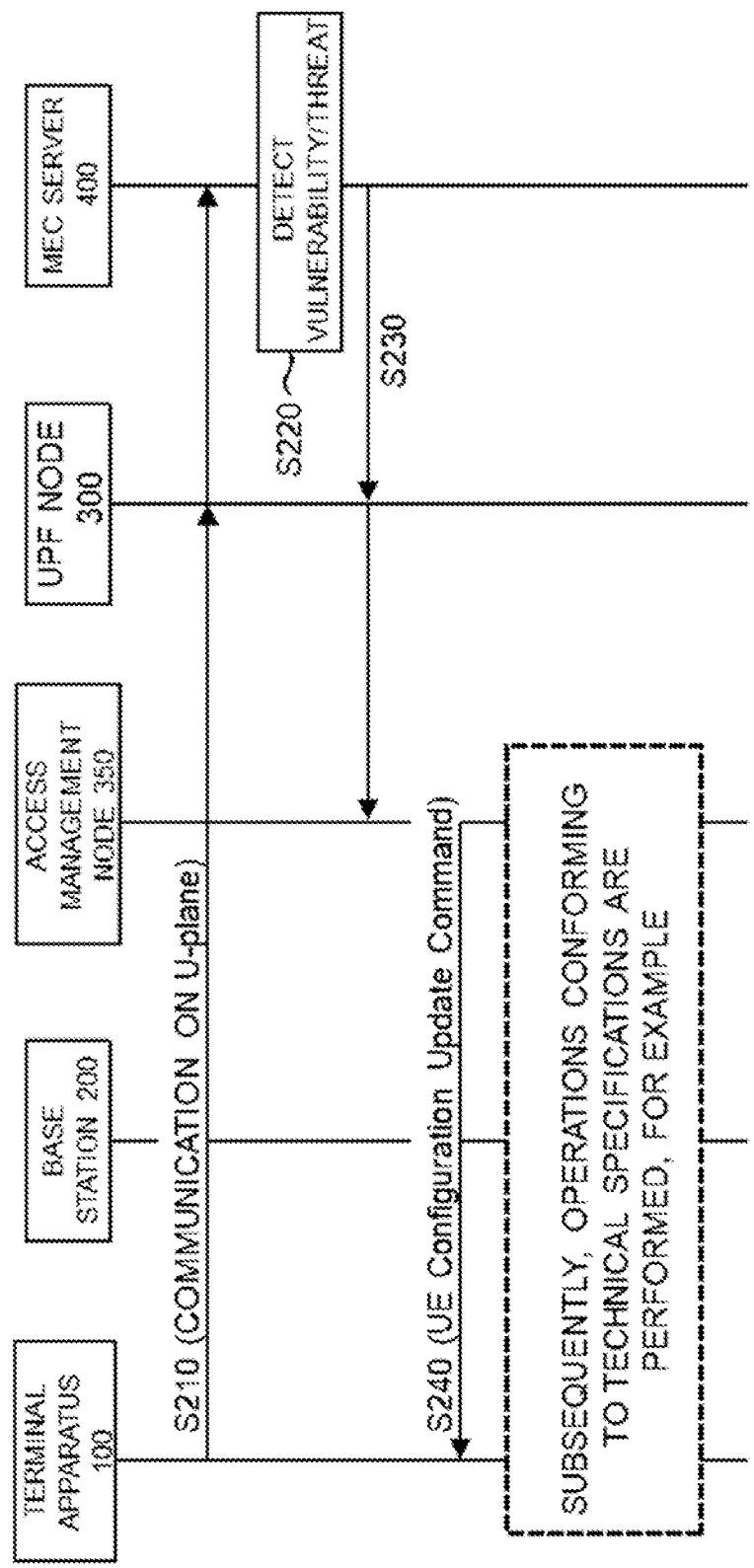
FIG. 13 is a sequence diagram illustrating a second operation example of the first example embodiment of the present invention.

FIG. 13 is a sequence diagram illustrating a second operation example of the present example embodiment. FIG. 13 corresponds to an example in which the MEC server 400 detects vulnerability or a threat, based on a content of communication from the terminal apparatus 100.

In step S210, the communication processing unit 132 of the terminal apparatus 100 sends and/or receives a signal on the U-plane to/from the MEC server 400 via the UPF node 300. The signal may be, for example, user data constituting a Web site or any of other user data.

In step S220, the detection unit 432 of the MEC server 400 detects vulnerability present in the terminal apparatus 100 or a threat to the terminal apparatus 100, based on the signal on the U-plane sent from and/or received by the terminal apparatus 100 (i.e., content of communication of the terminal apparatus 100 on the U-plane). The detection unit 432 can detect, for example, malware included in the data of the terminal apparatus 100 on the U-plane, as a threat.

In step S230, the communication processing unit 433 of the MEC server 400 notifies the access management node 350 via the UPF node 300 of the vulnerability or the threat detected by the detection unit 432, as the security information SI. Note that the communication processing unit 433 may notify the access management node 350 of a request for change of a configuration of the network slice including the security information SI above.

In step S240, similarly to the examples in FIGS. 11 and 12, the communication processing unit 333 of the access management node 350 sends, to the terminal apparatus 100, a command indicating a parameter related to the network slice NS for accommodating the terminal apparatus 100, based on the security information SI notified by the MEC server 400.

An operation caused by the command sent in step S240 is similar to that of the examples in FIGS. 11 and 12. Specifically, the terminal apparatus 100 may be accommodated in a quarantine network slice having a quarantine function, based on the security information SI, or the terminal apparatus 100 may be accommodated in the network slice NS having the security level corresponding to the security information SI. The command sent in step S240 may be a command for enabling such control as to separate, from the core network 30, an attack target indicated by the threat included in the security information SI.

In the following, similarly to the examples in FIGS. 11 and 12, each node including the terminal apparatus 100 performs an operation related to a configuration change of the network slice NS, based on vulnerability or a threat detected as described above (i.e., the security information SI), to thereby accommodate the terminal apparatus 100 in the appropriate network slice NS.

2.7.3. Third Operation Example

Figure 14:
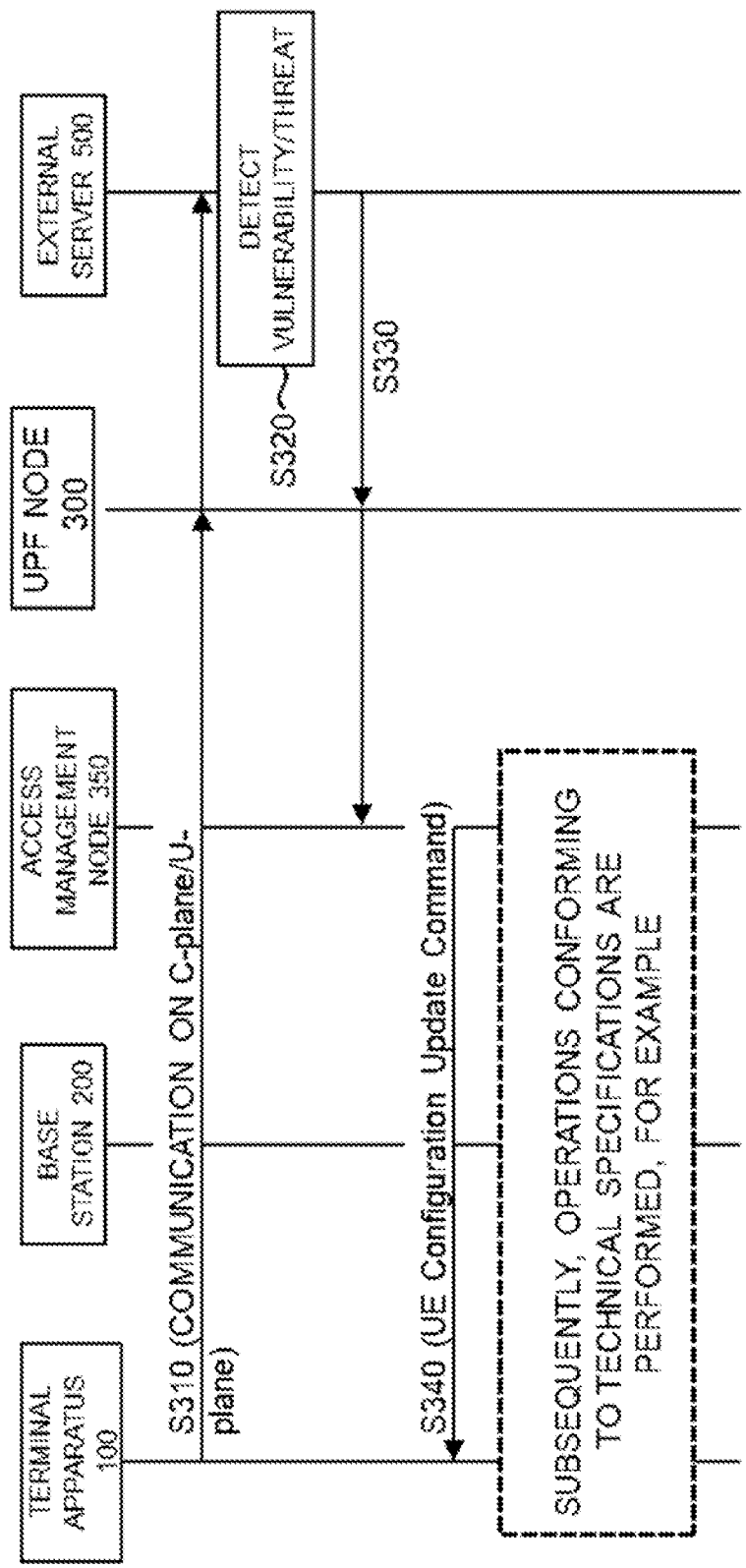
FIG. 14 is a sequence diagram illustrating a third operation example of the first example embodiment of the present invention.

FIG. 14 is a sequence diagram illustrating a third operation example of the present example embodiment. FIG. 14 corresponds to an example in which the external server 500 detects vulnerability or a threat, based on a content of communication from the terminal apparatus 100.

In step S310, the communication processing unit 132 of the terminal apparatus 100 sends and/or receives a signal on the C-plane and a signal on the U-plane to/from the external server 500. The signal on the C-plane may be, for example, log data or may be any of other control messages. The signal on the U-plane may be, for example, user data constituting a Web site or any of other user data.

In step S320, the detection unit 532 of the external server 500 detects vulnerability present in the terminal apparatus 100 or a threat to the terminal apparatus 100, based on the signal on the C-plane and/or the signal on the U-plane sent from and/or received by the terminal apparatus 100 (i.e., a content of communication of the terminal apparatus 100 on the C-plane and/or the U-plane). The detection unit 532 can detect, for example, malware included in the data of the terminal apparatus 100 on the U-plane, as a threat. In addition, the detection unit 532, for example, intercepts communication of the terminal apparatus 100 on the C-plane to thereby be able to detect a threat.

In step S330, the communication processing unit 533 of the external server 500 notifies, as the security information SI, the access management node 350 of the vulnerability or the threat detected by the detection unit 532. The communication processing unit 533 may send the security information SI as a signal on the U-plane to the access management node 350 via the UPF node 300 or may send the security information SI as a signal on the C-plane to the access management node 350. Note that the communication processing unit 533 may notify the access management node 350 of a request for change of a configuration of the network slice including the security information SI above.

In step S340, similarly to the examples in FIGS. 11 and 12, the communication processing unit 333 of the access management node 350 sends, to the terminal apparatus 100, a command indicating a parameter related to the network slice NS for accommodating the terminal apparatus 100, based on the security information SI notified by the external server 500.

An operation caused by the command sent in step S340 is similar to that of the examples in FIGS. 11 and 12. Specifically, the terminal apparatus 100 may be accommodated in a quarantine network slice having a quarantine function, based on the security information SI, or the terminal apparatus 100 may be accommodated in the network slice NS having the security level corresponding to the security information SI. The command sent in step S340 may be a command for enabling such control as to separate, from the core network 30, an attack target indicated by the threat included in the security information SI.

In the following, similarly to the examples in FIGS. 11 and 12, each node including the terminal apparatus 100 performs an operation related to a configuration change of the network slice NS, based on vulnerability or a threat detected as described above (i.e., the security information SI), to thereby accommodate the terminal apparatus 100 in the appropriate network slice NS.

According to the configuration of the present example embodiment, it is possible to perform processing of accommodation in an appropriate network slice, based on the security information SI detected by the access management node 350, the MEC server 400, or the external server 500. In other words, according to the configuration of the present example embodiment, the terminal apparatus 100 can be accommodated in an appropriate network slice.

In particular, even when various terminal apparatuses 100 are connected to the core network 30, each of the terminal apparatuses 100 can be dynamically accommodated in the appropriate network slice NS. Hence, the load of managing configurations individually for the respective terminal apparatuses 100 and the respective providers using the terminal apparatuses 100 is prevented. This can consequently reduce management load and management cost of the communication system S1.

In addition, since dynamic allocation of the network slices NS can be performed according to detected vulnerability or a detected threat, the scale of additional hardware installation (consequently, facility investment cost) can be reduced even when communication traffic has increased.

2.8. Example Alterations

Various alterations can be made to the present example embodiment. Concrete example aspects of the alterations will be described below as examples. Any two or more example aspects selected from the example embodiment and the following descriptions may be appropriately combined as long as there is no mutual inconsistency.

Based on the detection of vulnerability or a threat, a new network slice NS may be formed. It is preferable that a network slice NS suitable for the security information SI indicating the vulnerability or threat (e.g., a network slice NS having a security level corresponding to the level of the vulnerability or threat) be formed.

In the present example embodiment, vulnerability or a threat is detected based on a signal sent from and/or received by the terminal apparatus 100 (a signal on the C-plane or a signal on the U-plane), and allocation of the network slice NS is performed for each of the terminal apparatuses 100 as a unit.

However, since control of the network slices NS is performed for each of the terminal apparatuses 100 in the above configuration, processing granularity (control granularity) may be too fine. In view of this, in the preset example alteration, control of the network slices NS is performed for each provider, instead of each of the terminal apparatuses 100, as a unit.

For example, when a threat (attack) to a specific provider is detected by the detection unit 332 of the access management node 350, the detection unit 432 of the MEC server 400, or the detection unit 532 of the external server 500, the security information SI indicating the above threat (attack) is provided to the communication processing unit 333 of the access management node 350. The above threat may be detected based on a signal (a signal on the C-plane or a signal on the U-plane) sent from and/or received by a node managed by the specific provider.

The communication processing unit 333 of the access management node 350 performs control to accommodate the specific provider in another network slice NS (e.g., a network slice NS other than the network slice NS being an attack target indicated by the security information SI), based on the security information SI above thus provided.

"Accommodate a provider in the network slice NS" may mean, for example, to accommodate all or part of the nodes managed by the specific provider in the network slice NS. The nodes to be accommodated in the network slice NS may include the core network node 300 managed by the specific provider.

According to the above-described configuration of the present example alteration, control of the network slices NS is performed for each provider as a unit, and hence it is possible to perform more efficient accommodation processing.

3. Second Example Embodiment

Next, a description will be given of a second example embodiment of the present invention with reference to FIGS. 15 to 20. The above-described first example embodiment is a concrete example embodiment, whereas the second example embodiment is a more generalized example embodiment. According to the second example embodiment below, similar technical effects to those of the first example embodiment can be achieved.

3.1. Configuration and Operation Example of Access Management Node 350a

Figure 15:
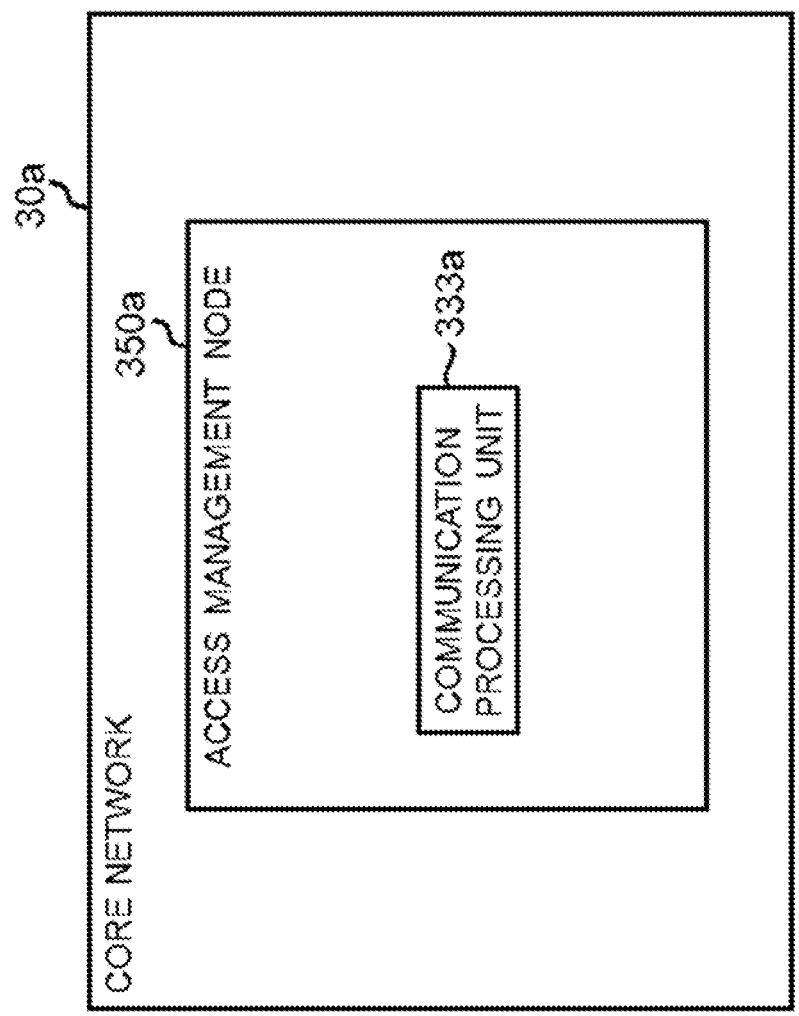
FIG. 15 is a block diagram illustrating an example of a schematic configuration of an access management node 350a according to a second example embodiment of the present invention.

FIG. 15 is a block diagram illustrating an example of a schematic configuration of an access management node 350a according to the second example embodiment of the present invention. As illustrated in FIG. 15, the access management node 350a is a core network node configured to belong to a core network 30a forming a plurality of network slices.

A communication processing unit 333a of the access management node 350a sends, to a terminal apparatus, a command indicating a parameter related to a network slice for accommodating the terminal apparatus, based on security information related to security of the terminal apparatus.

The access management node 350a and the communication processing unit 333a may be implemented with resources of the core network 30*a* virtualized by using the NFV technique. The access management node 350*a* may be implemented with a physical apparatus not using the NFV technique, and the communication processing unit 333*a* may be implemented with one or more processors, a memory (e.g., a nonvolatile memory and/or a volatile memory) and/or a hard disk. The memory may be included in the one or more processors or may be provided outside the one or more processors.

Relationship with First Example Embodiment

As an example, the communication processing unit 333*a* included in the access management node 350*a* according to the second example embodiment may perform the operations of the communication processing unit 333 included in the access management node 350 according to the first example embodiment. In the above case, the descriptions of the first example embodiment are also applicable to the second example embodiment. Note that the second example embodiment is not limited to the above example.

3.2. Configuration and Operation Example of MEC Server 400*a*

Figure 16:
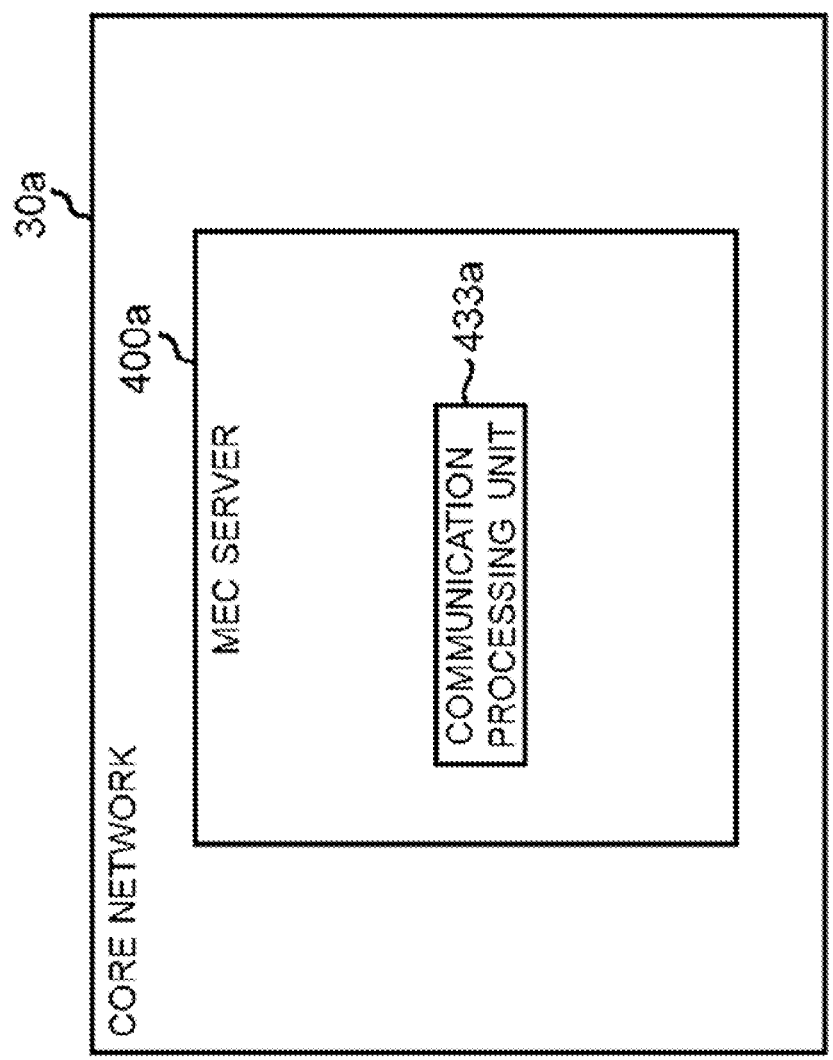
FIG. 16 is a block diagram illustrating an example of a schematic configuration of a MEC server 400a according to the second example embodiment of the present invention.

FIG. 16 is a block diagram illustrating an example of a schematic configuration of a MEC server 400*a* according to the second example embodiment of the present invention. As illustrated in FIG. 16, the MEC server 400 belongs to the core network 30*a* forming the plurality of network slices. Note that the MEC server 400*a* may be provided outside the core network 30*a* to be capable of communicating with the core network 30*a*.

A communication processing unit 433*a* of the MEC server 400*a* sends, to a core network node configured to belong to the core network 30*a*, a message including security information related to security of the terminal apparatus.

The MEC server 400*a* and the communication processing unit 433*a* may be implemented with resources of the core network 30*a* virtualized by using the NFV technique. The MEC server 400*a* may be implemented with a physical apparatus not using the NFV technique, and the communication processing unit 433*a* may be implemented with one or more processors, a memory (e.g., a nonvolatile memory and/or a volatile memory) and/or a hard disk. The memory may be included in the one or more processors or may be provided outside the one or more processors.

Relationship with First Example Embodiment

As an example, the communication processing unit 433*a* included in the MEC server 400*a* according to the second example embodiment may perform the operations of the communication processing unit 433 included in the MEC server 400 according to the first example embodiment. In the above case, the descriptions of the first example embodiment are also applicable to the second example embodiment. Note that the second example embodiment is not limited to the above example.

3.3. Configuration and Operation Example of External Server 500*a*

Figure 17:
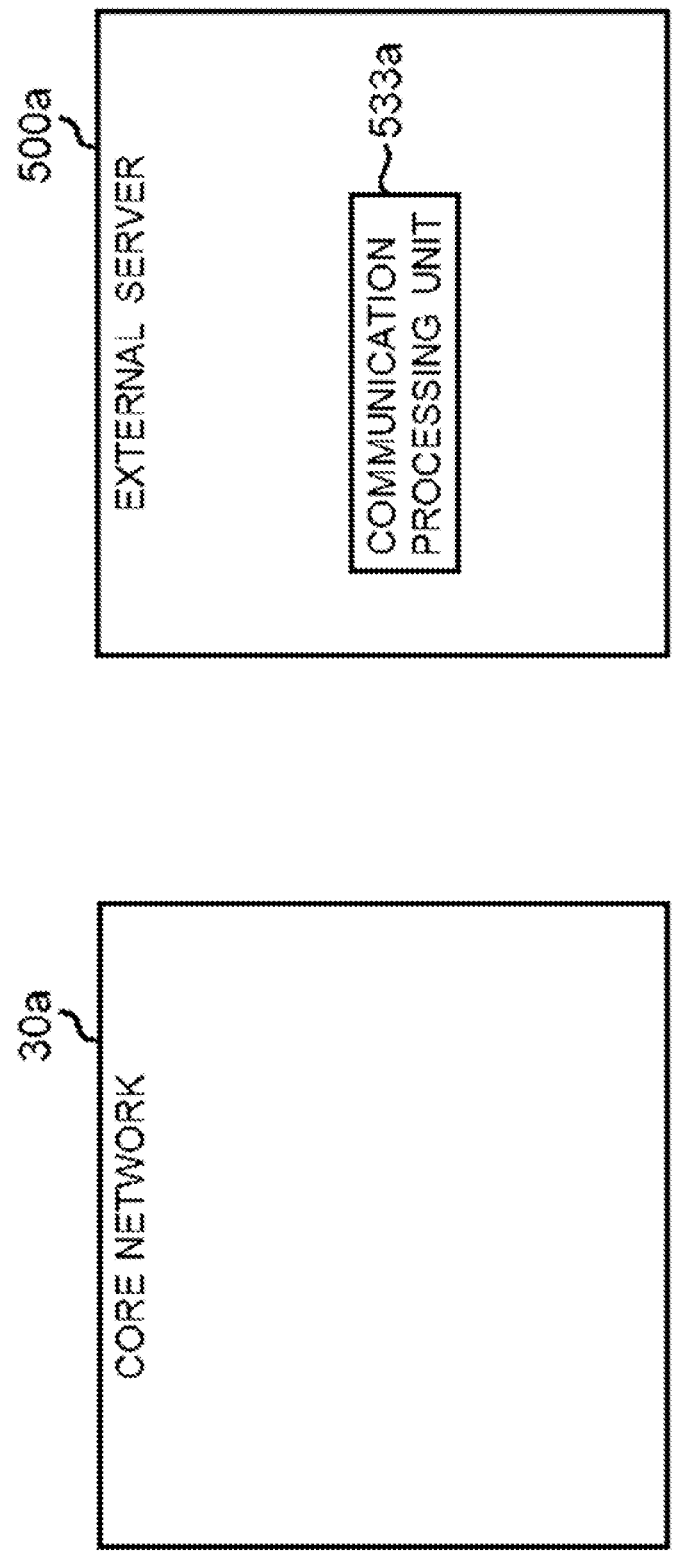
FIG. 17 is a block diagram illustrating an example of a schematic configuration of an external server 500a according to the second example embodiment of the present invention.

FIG. 17 is a block diagram illustrating an example of a schematic configuration of an external server 500*a* according to the second example embodiment of the present invention. As illustrated in FIG. 17, the external server 500 is provided to be capable of communicating with the core network 30*a* forming the plurality of network slices.

A communication processing unit 533*a* of the external server 500*a* sends, to a core network node configured to belong to the core network 30*a*, a message including security information related to security of the terminal apparatus.

The external server 500*a* may be implemented with a physical apparatus such as a server apparatus. The communication processing unit 533*a* may be implemented with one or more processors, a memory (e.g., a nonvolatile memory and/or a volatile memory) and/or a hard disk. The memory may be included in the one or more processors or may be provided outside the one or more processors.

Relationship with First Example Embodiment

As an example, the communication processing unit 533*a* included in the external server 500*a* according to the second example embodiment may perform the operations of the communication processing unit 533 included in the external server 500 according to the first example embodiment. In the above case, the descriptions of the first example embodiment are also applicable to the second example embodiment. Note that the second example embodiment is not limited to the above example.

«3.4.1. First Configuration and Operation Example of Communication System S1*a*»

FIG. 18 is a block diagram schematically illustrating an example of a first configuration of a communication system S1*a* according to the second example embodiment of the present invention. As illustrated in FIG. 18, the communication system S1*a* includes the access management node 350*a* as a core network node. The access management node 350*a* belongs to the core network 30*a* forming the plurality of network slices.

A communication processing unit 333*a* of the access management node 350*a* sends, to a terminal apparatus, a command indicating a parameter related to a network slice for accommodating the terminal apparatus, based on security information related to security of the terminal apparatus.

The access management node 350*a* and the communication processing unit 333*a* may be implemented with resources of the core network 30*a* virtualized by using the NFV technique. The access management node 350*a* may be implemented with a physical apparatus not using the NFV technique, and the communication processing unit 333*a* may be implemented with one or more processors, a memory (e.g., a nonvolatile memory and/or a volatile memory) and/or a hard disk. The memory may be included in the one or more processors or may be provided outside the one or more processors.

Relationship with First Example Embodiment

As an example, the communication processing unit 333*a* included in the access management node 350*a* according to the second example embodiment may perform the operations of the communication processing unit 333 included in the access management node 350 according to the first example embodiment. In the above case, the descriptions of the first example embodiment are also applicable to the second example embodiment. Note that the second example embodiment is not limited to the above example.

«3.4.2. Second Configuration and Operation Example of Communication System S1a»

FIG. 19 is a block diagram schematically illustrating an example of a second configuration of the communication system S1a according to the second example embodiment of the present invention. As illustrated in FIG. 19, the communication system S1a includes the access management node 350a as a core network node and also includes the MEC server 400a. The access management node 350a and the MEC server 400 belong to the core network 30a forming the plurality of network slices. Note that the MEC server 400a may be provided outside the core network 30a to be capable of communicating with the core network 30a.

The communication processing unit 433a of the MEC server 400a sends, to the access management node 350a (core network node), a message including security information related to security of a terminal apparatus.

The communication processing unit 333a of the access management node 350a sends, to the terminal apparatus, a command indicating a parameter related to a network slice for accommodating the terminal apparatus, based on security information from the MEC server 400a.

The access management node 350a and the communication processing unit 333a as well as the MEC server 400a and the communication processing unit 433a may be implemented with resources of the core network 30a virtualized by using the NFV technique. The access management node 350a and/or the MEC server 400a may be implemented with a physical apparatus not using the NFV technique, and the communication processing unit 333a and/or the communication processing unit 433a may be implemented with one or more processors, a memory (e.g., a nonvolatile memory and/or a volatile memory) and/or a hard disk. The memory may be included in the one or more processors or may be provided outside the one or more processors.

Relationship with First Example Embodiment

As an example, the communication processing unit 333a included in the access management node 350a according to the second example embodiment may perform the operations of the communication processing unit 333 included in the access management node 350 according to the first example embodiment. Similarly, the communication processing unit 433a included in the MEC server 400a according to the second example embodiment may perform the operations of the communication processing unit 433 included in the MEC server 400 according to the first example embodiment. In the above case, the descriptions of the first example embodiment are also applicable to the second example embodiment. Note that the second example embodiment is not limited to the above example.

«3.4.3. Third Configuration and Operation Example of Communication System S1a»

FIG. 20 is a block diagram schematically illustrating an example of a third configuration of the communication system S1a according to the second example embodiment of the present invention. As illustrated in FIG. 20, the communication system S1a includes the access management node 350a as a core network node and also includes the external server 500a. The access management node 350a belongs to the core network 30a forming the plurality of network slices. The external server 500a is provided to be capable of communicating with the core network 30a.

The communication processing unit 533a of the external server 500a sends, to the access management node 350a (core network node), a message including security information related to security of the terminal apparatus.

The communication processing unit 333a of the access management node 350a sends, to the terminal apparatus, a command indicating a parameter related to a network slice for accommodating the terminal apparatus, based on security information from the external server 500a.

The access management node 350a and the communication processing unit 333a may be implemented with resources of the core network 30a virtualized by using the NFV technique. The access management node 350a may be implemented with a physical apparatus not using the NFV technique, and the communication processing unit 333a may be implemented with one or more processors, a memory (e.g., a nonvolatile memory and/or a volatile memory) and/or a hard disk. The memory may be included in the one or more processors or may be provided outside the one or more processors.

The external server 500a may be implemented with a physical apparatus such as a server apparatus. The communication processing unit 533a may be implemented with one or more processors, a memory (e.g., a nonvolatile memory and/or a volatile memory) and/or a hard disk. The memory may be included in the one or more processors or may be provided outside the one or more processors.

Relationship with First Example Embodiment

As an example, the communication processing unit 333a included in the access management node 350a according to the second example embodiment may perform the operations of the communication processing unit 333 included in the access management node 350 according to the first example embodiment. Similarly, the communication processing unit 533a included in the external server 500a according to the second example embodiment may perform the operations of the communication processing unit 433 included in the MEC server 400 according to the first example embodiment. In the above case, the descriptions of the first example embodiment are also applicable to the second example embodiment. Note that the second example embodiment is not limited to the above example.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., the control unit, the detection unit and/or the communication processing unit) of the terminal apparatus, the base station, the core network node, the MEC server, and the external server described in the Specification (e.g., one or more apparatuses (or units) among a plurality of apparatuses (or units) constituting any of the above entities or a module for one of the plurality of apparatuses (or units)) may be provided.

Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

Supplementary Note 1

A core network node configured to belong to a core network forming a plurality of network slices, the core network node including:
a communication processing unit configured to send, to a terminal apparatus, a command indicating a parameter related to a network slice for accommodating the terminal apparatus, based on security information related to security of the terminal apparatus.

Supplementary Note 2

The core network node according to Supplementary Note 1, wherein the command includes slice information specifying the network slice for accommodating the terminal apparatus.

Supplementary Note 3

The core network node according to Supplementary Note 1 or 2, wherein the command is a UE Configuration Update Command for updating a configuration of the terminal apparatus.

Supplementary Note 4

The core network node according to Supplementary Note 2, wherein the slice information includes a Network Slice Selection Assistance Information (NSSAI) parameter for specifying a slice/service type.

Supplementary Note 5

The core network node according to any one of Supplementary Notes 1 to 4, wherein the communication processing unit is configured to cause a quarantine network slice having a quarantine function to accommodate the terminal apparatus, based on the security information.

Supplementary Note 6

The core network node according to any one of Supplementary Notes 1 to 4, wherein the communication processing unit is configured to cause the network slice having a security level corresponding to the security information, to accommodate the terminal apparatus.

Supplementary Note 7

The core network node according to any one of Supplementary Notes 1 to 4, wherein the communication processing unit is configured to separate an attack target indicated by the security information, from the core network.

Supplementary Note 8

The core network node according to any one of Supplementary Notes 1 to 7, including:
a detection unit configured to detect vulnerability present in the terminal apparatus, and notify the communication processing unit of the vulnerability thus detected, as the security information.

Supplementary Note 9

The core network node according to Supplementary Note 8, wherein the detection unit is configured to detect the vulnerability, based on a security capability of the terminal apparatus indicated in a registration request message sent from the terminal apparatus.

Supplementary Note 10

The core network node according to Supplementary Note 9, wherein the registration request message is sent from the terminal apparatus at time of location registration and includes an N2 parameter indicating the security capability.

Supplementary Note 11

The core network node according to any one of Supplementary Notes 8 to 10, wherein the detection unit is configured to detect the vulnerability, based on a content of communication of the terminal apparatus on a C-plane.

Supplementary Note 12

The core network node according to any one of Supplementary Notes 1 to 7, including:
a detection unit configured to detect a threat to the terminal apparatus, and notify the communication processing unit of the threat thus detected, as the security information.

Supplementary Note 13

The core network node according to Supplementary Note 12, wherein the detection unit is configured to detect the threat, based on a content of communication of the terminal apparatus on a C-plane.

Supplementary Note 14

The core network node according to any one of Supplementary Notes 1 to 7, wherein the communication processing unit is configured to receive, as the security information, vulnerability present in the terminal apparatus or a threat to the terminal apparatus detected by a Mobile Edge Computing (MEC) server configured to belong to the core network or configured to communicate with the core network.

Supplementary Note 15

The core network node according to Supplementary Note 14, wherein the security information indicates the vulnerability or the threat detected by the MEC server, based on a content of communication of the terminal apparatus on a U-plane.

Supplementary Note 16

The core network node according to any one of Supplementary Notes 1 to 7, wherein the communication processing unit is configured to receive, as the security information, vulnerability present in the terminal apparatus or a threat to the terminal apparatus detected by an external server located outside the core network.

Supplementary Note 17

The core network node according to Supplementary Note 16, wherein the security information indicates the vulnerability or the threat detected by the external server, based on a content of communication of the terminal apparatus on a C-plane and/or a U-plane.

Supplementary Note 18

The core network node according to any one of Supplementary Notes 1 to 17, wherein the core network node is Access and Mobility Management Function.

Supplementary Note 19

A MEC server configured to belong to a core network forming a plurality of network slices or configured to communicate with a core network forming a plurality of network slices, the MEC server including:
a communication processing unit configured to send, to a core network node configured to belong to the core network, a message including security information related to security of the terminal apparatus.

Supplementary Note 20

The MEC server according to Supplementary Note 19, including:
a detection unit configured to detect vulnerability present in the terminal apparatus or a threat to the terminal apparatus, and notify the communication processing unit of the vulnerability or the threat thus detected, as the security information.

Supplementary Note 21

An external server configured to communicate with a core network forming a plurality of network slices, the external server including:
a communication processing unit configured to send, to a core network node configured to belong to the core network, a message including security information related to security of the terminal apparatus.

Supplementary Note 22

The external server according to Supplementary Note 21, including:
a detection unit configured to detect vulnerability present in the terminal apparatus or a threat to the terminal apparatus, and notify the communication processing unit of the vulnerability or the threat thus detected, as the security information.

Supplementary Note 23

A communication system including:
a core network node configured to belong to a core network forming a plurality of network slices, wherein
the core network node includes
a communication processing unit configured to send, to a terminal apparatus, a command indicating a parameter related to a network slice for accommodating the terminal apparatus, based on security information related to security of the terminal apparatus.

Supplementary Note 24

A communication system including:
a core network node configured to belong to a core network forming a plurality of network slices; and
a MEC server configured to belong to the core network or configured to communicate with the core network, wherein
the MEC server includes
a communication processing unit configured to send, to the core network node, a message including security information related to security of a terminal apparatus, and
the core network node includes
a communication processing unit configured to send, to the terminal apparatus, a command indicating a parameter related to a network slice for accommodating the terminal apparatus, based on the security information from the MEC server.

Supplementary Note 25

A communication system including:
a core network node configured to belong to a core network forming a plurality of network slices; and
an external server configured to communicate with the core network, wherein
the external server includes
a communication processing unit configured to send, to the core network node, a message including security information related to security of a terminal apparatus, and
the core network node includes
a communication processing unit configured to send, to the terminal apparatus, a command indicating a parameter related to a network slice for accommodating the terminal apparatus, based on the security information from the external server.

Supplementary Note 26

A control method of a core network node configured to belong to a core network forming a plurality of network slices, the control method including:
sending, to a terminal apparatus, a command indicating a parameter related to a network slice for accommodating the terminal apparatus, based on security information related to security of the terminal apparatus.

Supplementary Note 27

A program causing a computer to function as
a core network node
configured to belong to a core network forming a plurality of network slices, and
including a communication processing unit configured to send, to a terminal apparatus, a command indicating a parameter related to a network slice for accommodating the terminal apparatus, based on security information related to security of the terminal apparatus.

Supplementary Note 28

A non-transitory recording medium having recorded thereon a program, the program causing a computer to function as
a core network node
configured to belong to a core network forming a plurality of network slices, and
including a communication processing unit configured to send, to a terminal apparatus, a command indicating a parameter related to a network slice for accommodating the terminal apparatus, based on security information related to security of the terminal apparatus.

Supplementary Note 29

A core network node configured to belong to a core network forming a plurality of network slices, the core network node including:
a detection unit configured to detect a threat in terms of security, based on a signal sent from and/or received by a node managed by a specific provider; and
a communication processing unit configured to perform control to accommodate the specific provider in another network slice, based on the threat thus detected.

Supplementary Note 30

A Mobile Edge Computing (MEC) server configured to belong to a core network forming a plurality of network slices or configured to communicate with the core network forming the plurality of network slices, the MEC server including:
a detection unit configured to detect a threat in terms of security, based on a signal sent from and/or received by a node managed by a specific provider; and
a communication processing unit configured to send, to a core network node configured to belong to the core network, a message including security information indicating the threat thus detected.

Supplementary Note 31

An external server configured to communicate with a core network forming a plurality of network slices, the external server including:
a detection unit configured to detect a threat in terms of security, based on a signal sent from and/or received by a node managed by a specific provider; and
a communication processing unit configured to send, to a core network node configured to belong to the core network, a message including security information indicating the threat thus detected.

Supplementary Note 32

A communication system including:
a core network node configured to belong to a core network forming a plurality of network slices, wherein
the core network node includes
a communication processing unit configured to perform control to accommodate a specific provider in another network slice, based on a threat in terms of security detected based on a signal sent from and/or received by a node managed by the specific provider.

Supplementary Note 33

A control method of a core network node configured to belong to a core network forming a plurality of network slices, the control method including:
performing control to accommodate a specific provider in another network slice, based on a threat in terms of security detected based on a signal sent from and/or received by a node managed by the specific provider.

Supplementary Note 34

A program causing a computer to function as
a core network node
configured to belong to a core network forming a plurality of network slices, and
including a communication processing unit configured to perform control to accommodate a specific provider in another network slice, based on a threat in terms of security detected based on a signal sent from and/or received by a node managed by the specific provider.

Supplementary Note 35

A non-transitory recording medium having recorded thereon a program, the program causing a computer to function as
a core network node
configured to belong to a core network forming a plurality of network slices, and
including a communication processing unit configured to perform control to accommodate a specific provider in another network slice, based on a threat in terms of security detected based on a signal sent from and/or received by a node managed by the specific provider.

This application claims priority based on JP 2020-110059 filed on Jun. 26, 2020, the entire disclosure of which is incorporated herein.

INDUSTRIAL APPLICABILITY

It is possible to accommodate the terminal apparatus 100 in an appropriate network slice, based on the security information SI (vulnerability or a threat) detected by the access management node 350, the MEC server 400, or the external server 500.

Reference Signs List

S1 Communication System
30 Core Network
100 Terminal Apparatus
200 Base Station
300 Core Network Node
350 Access Management Node
400 MEC Server
500 External Server

What is claimed is:
1. A User Equipment (UE) comprising:
at least one processor; and
at least one memory storing instructions that, when executed by the at least one processor, cause the at least one processor to:

send, to a first core network node, a request; and obtain, from the first core network node, information that is provided by the first core network node using security information, wherein the security information is obtained, at the first core network node, from a second core network node configured for supporting Edge Computing, and wherein the second core network node has user plane connectivity with a User Plane Function (UPF) and the second core network node is distinct from a Session Management Function (SMF).

2. A method of a User Equipment (UE), the method comprising:

sending, to a first core network node, a request; and obtaining, from the first core network node, information that is provided by the first core network node using security information, wherein the security information is obtained, at the first core network node, from a second core network node configured for supporting Edge Computing, and wherein the second core network node has user plane connectivity with a User Plane Function (UPF) and the second core network node is distinct from a Session Management Function (SMF).

3. A method of a first core network node, the method comprising:

receiving, from a User Equipment (UE), a request;

obtaining, from a second core network node configured for supporting Edge Computing, security information, wherein the second core network node has user plane connectivity with a User Plane Function (UPF) and the second core network node is distinct from a Session Management Function (SMF); and providing, to the UE, information using the security information.

* * * * *